(12) United States Patent
Duan et al.

(10) Patent No.: US 12,360,269 B2
(45) Date of Patent: Jul. 15, 2025

(54) ESTIMATING TIME-LAPSE PROPERTY CHANGES OF A SUBSURFACE VOLUME

(71) Applicant: SHELL OIL COMPANY, Houston, TX (US)

(72) Inventors: Yuting Duan, Houston, TX (US); Siyuan Yuan, Stanford, CA (US); Paul James Hatchell, Houston, TX (US); Jeremy Paul Vila, Houston, TX (US); Kanglin Wang, Houston, TX (US)

(73) Assignee: SHELL USA, INC., Houston, TX (US)

( * ) Notice: Subject to any disclaimer, the term of this patent is extended or adjusted under 35 U.S.C. 154(b) by 284 days.

(21) Appl. No.: 17/912,262

(22) PCT Filed: Apr. 12, 2021

(86) PCT No.: PCT/EP2021/059414
§ 371 (c)(1),
(2) Date: Sep. 16, 2022

(87) PCT Pub. No.: WO2021/209375
PCT Pub. Date: Oct. 21, 2021

(65) Prior Publication Data
US 2023/0184973 A1 Jun. 15, 2023

Related U.S. Application Data

(60) Provisional application No. 63/089,477, filed on Oct. 8, 2020, provisional application No. 63/010,243, filed on Apr. 15, 2020.

(51) Int. Cl.
*G06F 11/30* (2006.01)
*G01V 1/28* (2006.01)
(Continued)

(52) U.S. Cl.
CPC .............. *G01V 1/282* (2013.01); *G01V 1/306* (2013.01); *G01V 1/308* (2013.01); *G06N 3/0464* (2023.01);
(Continued)

(58) Field of Classification Search
CPC ...................................................... G01V 1/282
See application file for complete search history.

(56) References Cited

U.S. PATENT DOCUMENTS

| 10,614,618 B2 | 4/2020 | Griffith |
| 2019/0064389 A1 | 2/2019 | Denli et al. |

(Continued)

OTHER PUBLICATIONS

International Search Report and Written Opinion received for PCT Patent Application No. PCT/EP2021/059414, mailed on Jul. 2, 2021, 10 pages.
(Continued)

*Primary Examiner* — Phuong Huynh
(74) *Attorney, Agent, or Firm* — SHELL USA, INC.

(57) ABSTRACT

A backpropagation enabled model is trained for estimating time-lapse property changes of a subsurface volume. Synthetic models of the subsurface volume are generated, with pre-determined property changes before and after a time lapse. These models are used to compute baseline-monitor pairs of synthetic seismic traces before and after the time lapse, wherein the baseline synthetic traces are computed from the synthetic model before the time lapse and the monitor synthetic traces are computed from the synthetic model after the time lapse. A ground truth 4D attribute characterizing the time-lapse property changes in the synthetic models is defined, and a backpropagation enabled model is trained by feeding the baseline-monitor pairs of synthetic seismic traces and the corresponding ground truth 4D attribute. The thus obtained trained backpropagation enabled model can be used to estimate time-lapse property
(Continued)

changes of the actual subsurface Earth volume from actual baseline-monitor pairs of seismic traces.

9 Claims, 21 Drawing Sheets

(51) Int. Cl.
   *G01V 1/30* (2006.01)
   *G06N 3/0464* (2023.01)
   *G06N 3/084* (2023.01)

(52) U.S. Cl.
   CPC ....... *G06N 3/084* (2013.01); *G01V 2210/612* (2013.01); *G01V 2210/66* (2013.01)

(56) References Cited

U.S. PATENT DOCUMENTS

| | | | |
|---|---|---|---|
| 2019/0383965 | A1* | 12/2019 | Salman .............. G01V 3/18 |
| 2021/0223422 | A1 | 7/2021 | Griffith et al. |
| 2021/0223423 | A1 | 7/2021 | Griffith et al. |
| 2022/0113440 | A1 | 4/2022 | Griffith et al. |
| 2022/0113441 | A1 | 4/2022 | Griffith et al. |

OTHER PUBLICATIONS

Onuwaje et al., "The Bonga 4d—Shell Nigeria's First Deepwater Time Lapse Monitor", European Association of Geoscientists & Engineers, Jun. 2009.

Detomo et al., "Ocean Bottom Node Seismic: Learnings From Bonga, Deepwater Offshore Nigeria", SEG Technical Program Expanded Abstracts, Sep. 2012, pp. 1-5.

Hatchell et al., "Measuring Reservoir Compaction Using Time-lapse Timeshifts", SEG Technical Program Expanded Abstracts, Jun. 12, 2006, pp. 2500-2503.

Ronneberger et al., "U-net: Convolutional Networks for Biomedical Image Segmentation", International Conference on Medical Image Computing and Computer-assisted Intervention, Oct. 2015.

Stopin et al., "First OBS to OBS Time Lapse Results in the Mars Basin", SEG Technical Program Expanded Abstracts, Sep. 18, 2011, pp. 4114-4119.

Macbeth et al., "Evaluation of the Spurious Time-shift Problem", SEG Technical Program Expanded Abstracts, 2016, pp. 5457-5462.

Dramsch et al., "Including Physics in Deep Learning—an Example From 4D Seismic Pressure Saturation Inversion", 81st Eage Conference and Exhibition 2019 Workshop Programme, Jun. 3-6, 2019, vol. 2019, pp. 1-5.

Duan et al., "Estimation of Time-lapse Timeshifts Using Machine Learning", SEG Technical Program Expanded Abstracts, Sep. 2020, pp. 3724-3729.

Dramsch et al., "Deep Unsupervised 4d Seismic 3d Time-shift Estimation With Convolutional Neural Networks", IEEE Transactions on Geoscience and Remote Sensing, Oct. 31, 2019.

Hatchell et al., "Estimating Time Lapse Seismic Attributes Using Machine Learning", Jul. 2019, 22 Pages.

Dramsch, "Machine Learning in 4d Seismic Data Analysis Deep Neural Networks in Geophysics", Phd Thesis Doctor of Philosophy, 2019, 200 Pages.

Yuan et al., "Time-lapse seismic timeshift estimation using deep neural networks", AAAI, 2012, 6 Pages.

* cited by examiner

ESTIMATING TIME-LAPSE PROPERTY CHANGES OF A SUBSURFACE VOLUME

CROSS REFERENCE TO RELATED APPLICATIONS

This is a National stage application of International application No PCT/EP2021/059414, filed 12 Apr. 2021, which claims priority of U.S. application No. 63/010,243, filed 15 Apr. 2020 and U.S. application No. 63/089,477, filed 8 Oct. 2020 which is incorporated herein by reference in its entirety.

FIELD OF THE INVENTION

The present invention relates to a computer-implemented method of estimating time-lapse property changes of a subsurface volume. The present invention further relates to a computer-implemented method of training a backpropagation enabled model for estimating time-lapse property changes of a subsurface volume.

BACKGROUND TO THE INVENTION

Time-lapse (4D) seismic is a proven technology to monitor oil & gas production. Changes in seismic data can indicate fluid saturation changes due to aquifer encroachment or water injection, reservoir thickness changes due to compaction (Hatchell and Bourne, 2005), and other types of changes (e.g., steam or $CO_2$ injection), surface subsidence, and subsurface deformations. Effective areal monitoring can guide well placement and staged field development with reduced cost and improved recovery factor. Time shifts, referred to as the time-lapse difference in two-way travel time or depth of seismic images, is often observed in 4D seismic data. Because it can be directly related to velocity or geomechanical changes, it is used as a key attribute for 4D seismic interpretation (Hatchell and Bourne, 2005). With accurate time shifts, we can also align monitor and baseline seismic data to estimate amplitude-related 4D attributes.

A common approach to compute time shifts is trace-by-trace cross-correlation (Xcor), which is reliable, fast, and easy to implement. However, when seismic amplitudes change as is typical near producing reservoirs, baseline and monitor seismic data cannot be perfectly aligned and, as a result, Xcor often produces anomalous time shifts, which leads to false 4D interpretation (MacBeth, et al., 2016). Besides, using Xcor requires tuning window length, which can be tricky in some cases: when window is set to be too narrow, time shifts can be greatly impacted by noise; while with too broad time window, time shifts tend to be spread out and thus lose spatial resolution. Solving an inversion problem is another method to estimate time shifts, which can potentially avoid the time shifts anomalies. However, inversion is typically non-linear and can be limited by complicated setup and local minimum issues.

SUMMARY OF THE INVENTION

In one aspect, there is provided a computer-implemented method of estimating time-lapse property changes of a subsurface volume, comprising:
providing actual baseline-monitor pairs of baseline seismic traces of a physical subsurface Earth volume and monitor seismic traces of the physical subsurface Earth volume as obtained from physical seismic measurements in the physical subsurface Earth volume acquired at respectively a first time and second time which is later than the first time by a time lapse;
feeding the actual baseline-monitor pairs of seismic traces to a trained backpropagation enabled model, and obtaining as output estimates of the time-lapse property changes of the actual subsurface Earth volume, wherein the trained backpropagation enabled model has been obtained by:
generating synthetic models of the subsurface volume with pre-determined property changes before and after a time lapse, said synthetic models comprising seismic velocities;
computing baseline-monitor pairs of synthetic seismic traces using the models generated in before and after the time lapse wherein the baseline synthetic traces are computed from the synthetic model before the time lapse and the monitor synthetic traces are computed from the synthetic model after the time lapse;
deriving a ground truth 4D attribute characterizing the time-lapse property changes in the synthetic models;
training a backpropagation enabled model by feeding the baseline-monitor pairs of synthetic seismic traces and the corresponding ground truth 4D attribute, whereby obtaining the trained backpropagation enabled model.

In another aspect, there is provided a computer-implemented method of training a backpropagation enabled model for estimating time-lapse property changes of a subsurface volume, comprising:
generating synthetic models of the subsurface volume with pre-determined property changes before and after a time lapse, said synthetic models comprising seismic velocities;
computing baseline-monitor pairs of synthetic seismic traces using the models generated before and after the time lapse wherein the baseline synthetic traces are computed from the synthetic model before the time lapse and the monitor synthetic traces are computed from the synthetic model after the time lapse;
deriving a ground truth 4D attribute characterizing the time-lapse property changes in the synthetic models;
training a backpropagation enabled model by feeding the baseline-monitor pairs of synthetic seismic traces and the corresponding ground truth 4D attribute, whereby obtaining the trained backpropagation enabled model.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF THE INVENTION

Figure 1:
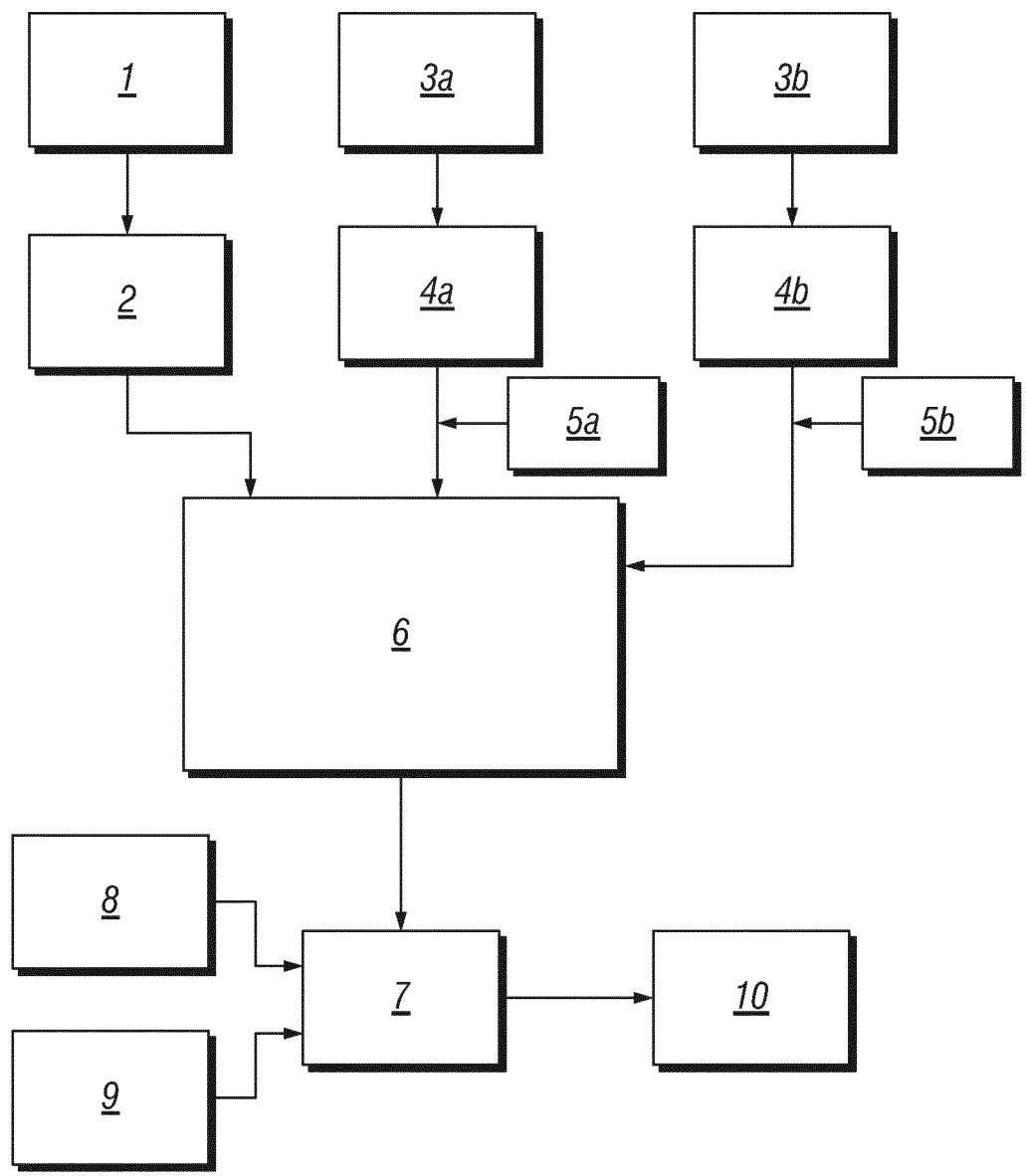
FIG. 1 schematically shows a block diagraph incorporating the proposed method.

The person skilled in the art will readily understand that, while the detailed description of the invention will be illustrated making reference to one or more embodiments, each having specific combinations of features and measures, many of those features and measures can be equally or similarly applied independently in other embodiments or combinations.

We introduce a novel approach to estimate time shifts and/or changes in a formation property over time from time-lapse seismic data, which uses a backpropagation enabled process, such as machine learning. The time-lapse in this context is intended to be sufficiently long for changes in an Earth volume to materialize, for example during extraction and/or injection of fluids from an Earth formation. Typical time-lapses exceed a number of months, for example 6 months or 12 months. Backpropagation enabled models, which may also be referred to as machine learning models ("ML models"), may be trained for each subsurface volume (e.g. a specific reservoir field) of interest by generating synthetic seismic data using 4D models, such as reservoir and geomechanical models, which undergo pre-determined property changes. Baseline and monitor seismic traces are thereby provided as two distinguished input channels into the backpropagation enabled model.

An advantage of employing a backpropagation enabled model is that these can be trained using samples generated with realistic physical models to predict 4D attributes in a more accurate way. For example, it is possible to label data with time shifts that are tied to velocity changes, which in the case of windowed Xcor would otherwise require manual steps, such as interpolation and window length tuning, to mitigate.

Examples of backpropagation-enabled processes include, without limitation, artificial intelligence, machine learning, and deep learning. An example of a backpropagation-enabled process is a deep learning process which employs an artificial (e.g. computer-implemented) neural network, for instance, but not limited to, a convolutional neural network. It will be understood by those skilled in the art that advances in backpropagation-enabled processes continue rapidly. The currently proposed method is expected to be applicable to those advances, even if under a different name. Accordingly, the method of the present invention is applicable to the further advances in backpropagation-enabled processes, even if not expressly named herein.

The backpropagation-enabled process may be supervised, semi-supervised, unsupervised or a combination thereof. A supervised process may be made semi-supervised by the addition of an unsupervised technique. An example of such unsupervised technique may be an auto-encoder step. Examples of an unsupervised backpropagation-enabled process include, without limitation, a variational autoencoder (VAE) process and a generative adversarial network (GAN) process. Examples of a semi-supervised backpropagation-enabled process include, without limitation, a semi-supervised VAE process and a semi-supervised GAN process.

Specifically, a preferred embodiment is presented in the form of a time-shift estimation method using a deep neural network ("ML model"). This network directly maps traces of baseline and monitor to time shifts without the need of a tuning window length. The problem of estimating time shifts is thereby treated as a supervised learning problem. The proposed method may comprise three main steps. First reservoir and/or geomechanical models are built, with known (pre-determined) property changes (saturation, pressure). A rock-physics model and 1D convolution are used to generate baseline and monitor pairs of synthetic seismic traces with known ground truth time shifts. Next, a machine learning model is trained with the synthetic baseline-monitor seismic pairs as inputs and the ground truth time shifts as labels.

To make a comprehensive training set that captures a large range of expected responses, the following parameters may be varied for synthetic data generation: reservoir thickness, reservoir depth, wavelet frequency, oil saturation change, water sweep type (top, bottom, and uniform), and thickness/size ratio (for geomechanical compaction effects). Random noise (with the same spectrum as signal but with random phase shifts) may optionally be added to baseline and monitor data.

FIG. 1 shows a block diagram which incorporates the proposed methodology. Block 1 represents generating synthetic models of the subsurface volume with pre-determined property changes before a time lapse. These synthetic models are models of an actual subsurface volume of interest for which actual seismic data is or will be available. The synthetic models comprise seismic velocities of the formation rocks before the time lapse. Block 2 represents computing of baseline synthetic seismic traces using the model of Block 1 with the seismic velocities before the property changes which will occur during the time lapse.

Blocks 3a and 3b represent generating synthetic models of the same subsurface volume, but with incorporated predetermined property changes that have occurred during the time-lapse. The property changes may be reflected by changes in seismic velocity, compaction, movement of formation layers, etc.. These synthetic models are models of an actual subsurface volume of interest for which actual seismic data is or will be available. Blocks 4a and 4b represent computing of monitor synthetic seismic traces using the respective models of Block 3a and 3b.

In FIG. 1 only two property changes (a and b) are illustrated. However, a large number of different property changes may be imposed, each providing a set of baseline-monitor pairs of synthetic seismic traces. A ground truth 4D attribute 5a, 5b, etc. is defined for each property change, which characterizes the time-lapse property changes in the synthetic models.

Pairs of baseline-monitor synthetic seismic traces, are labeled with the ground truth 4D attribute, are input to a backpropagation enabled training process, exemplified in Block 6. This Block comprises training a backpropagation enabled model using the baseline-monitor pairs of synthetic seismic trace, and the corresponding ground truth 4D labels as input feeds. Pairs of baseline and monitor seismic traces are thereby offered as two distinguished input channels into the backpropagation enabled model. The training process may involve minimizing of an objective function, for example using a root mean square error between the back propagation enabled model being trained and a ground truth 4D attribute array. This is one example of backpropagation.

Actual baseline and monitor seismic traces (respectively represented in Blocks 8 and 9) are then fed as to the resulting trained back propagation enabled model 7. In this mode, the trained back propagation enabled model 7 provides as output estimated time-lapse property changes of the actual subsurface Earth volume, or estimated time-lapse time shifts, as represented in Block 10.

In the context of the present invention, seismic traces are provided in any suitable computer readable format.

The machine learning model may be adopted from a U-Net structure that was originally used in medical image segmentation. However, in the proposed current method the convolutional layers may be 1D, rather than 2D as in the original paper (Ronneberger et al, 2015), using 1-D versions of the convolution, max pooling and up-convolution operations instead of the 2-D versions. Furthermore, the inputs are pairs of seismic traces acquired at different times instead of single medical images taught in the original paper. The two traces are treated as two channels of the input layer, and are merged into the first hidden layer through a 1-D convolution (with a ReLU activation function).

A variety of models exist which comprise a U-net structure. The term U-net structure refers to the architecture of the backpropagation enabled model. As will be understood by the person skilled in the art, model architecture is defined by a variety of model hyperparameters, which may typically include the number of layers in the model, the number of convolutions per layer, kernel shapes of each convolution, and maximum pooling verses "strided convolutions." Validation data (sometimes referred to as a hold-out dataset) may be employed to select a suitable model from a number of alternatives.

Baseline and monitor may be combined in the input layers as two channels. The loss function used is mean-squared error (MSE):

$$MSE = \frac{1}{n}\sum_{i=1}^{n}(Y_i - \tilde{Y}_i)^2$$

wherein Y refers to ground truth timeshifts, $\tilde{Y}$ is the ML prediction, and n is the number of time samples in each seismic trace.

Root-mean-squared error (RMSE) methodology has been be used to evaluate and compare the performance of Xcor and ML:

$$RMSE = \sqrt{\frac{1}{n}\sum_{i=1}^{n}(Y_i - \tilde{Y}_i)^2}.$$

The ML model in our example was trained with one Nvidia Tesla K80 GPU machine, and it converges to the lowest error within six hours. Validation MSE and RMSE are, respectively, 0.0024 ms$^2$ and 0.049 ms. The presented examples have been generated using convolution, max pooling, and up-conversion filter sizes of respectively 3, 2, and 2. The filter sizes are hyperparameters that can be tuned based on the performance of the validation set.

The proposed method has been demonstrated with data from two fields: Bonga and Mars. The Bonga field has mainly saturation-based changes occurring, and the response in the Mars field is mainly compaction driven. Separate training datasets were generated based on the reservoir/geomechanical models of each specific field.

The Bonga field is in deepwater Nigeria, and 4D seismic has been successfully used to image the amplitude changes due to production (Adejonwo et al., 2009; Detomo et al., 2012). Oil production from the main reservoirs is through injection/producer well pairs that keep the reservoir pressure nearly constant, and we model that time-lapse change is due to saturation changes only.

Figure 2A:
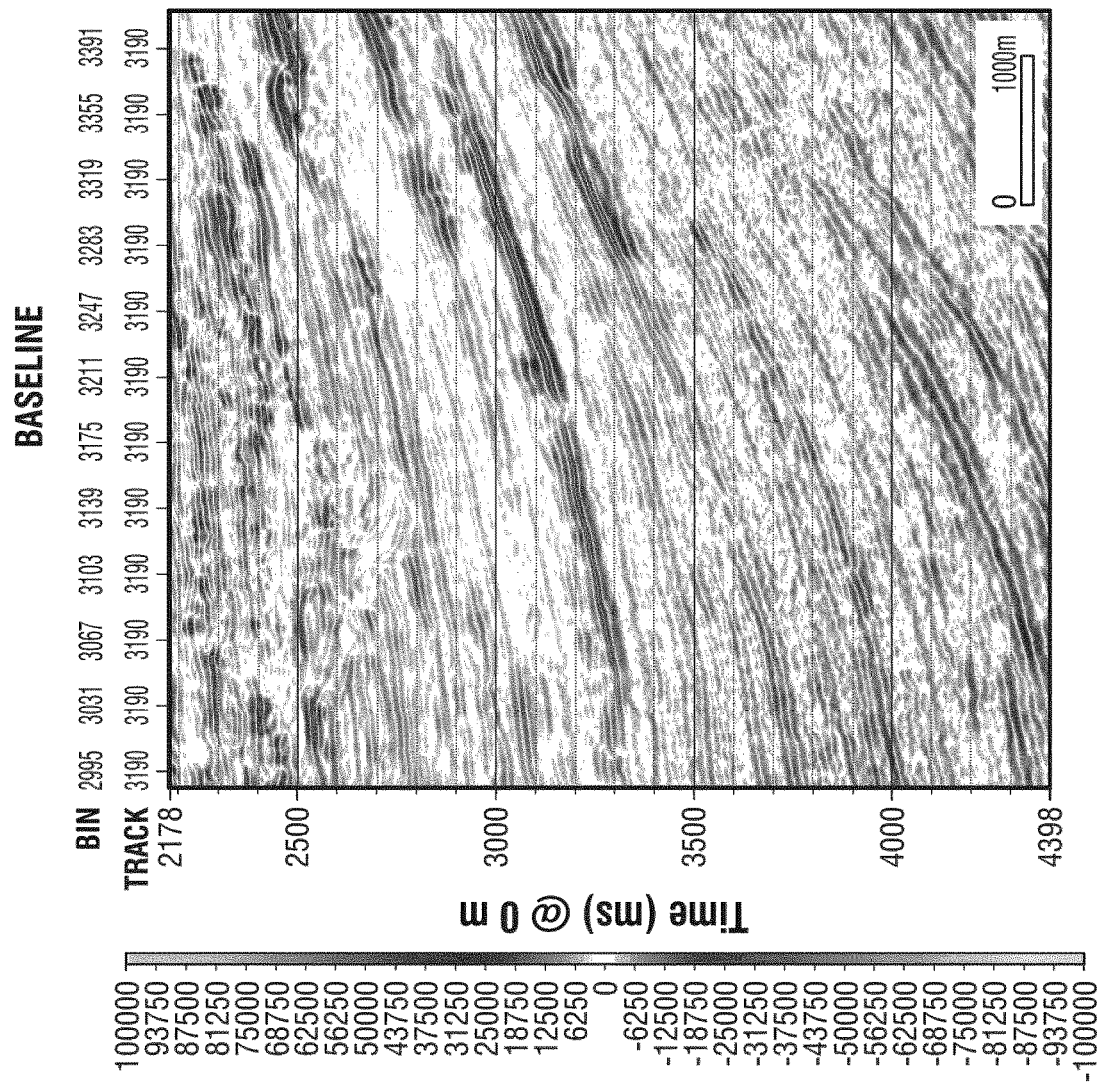
FIG. 2A shows an image of baseline seismic data from the Bonga field.
Figure 2B:
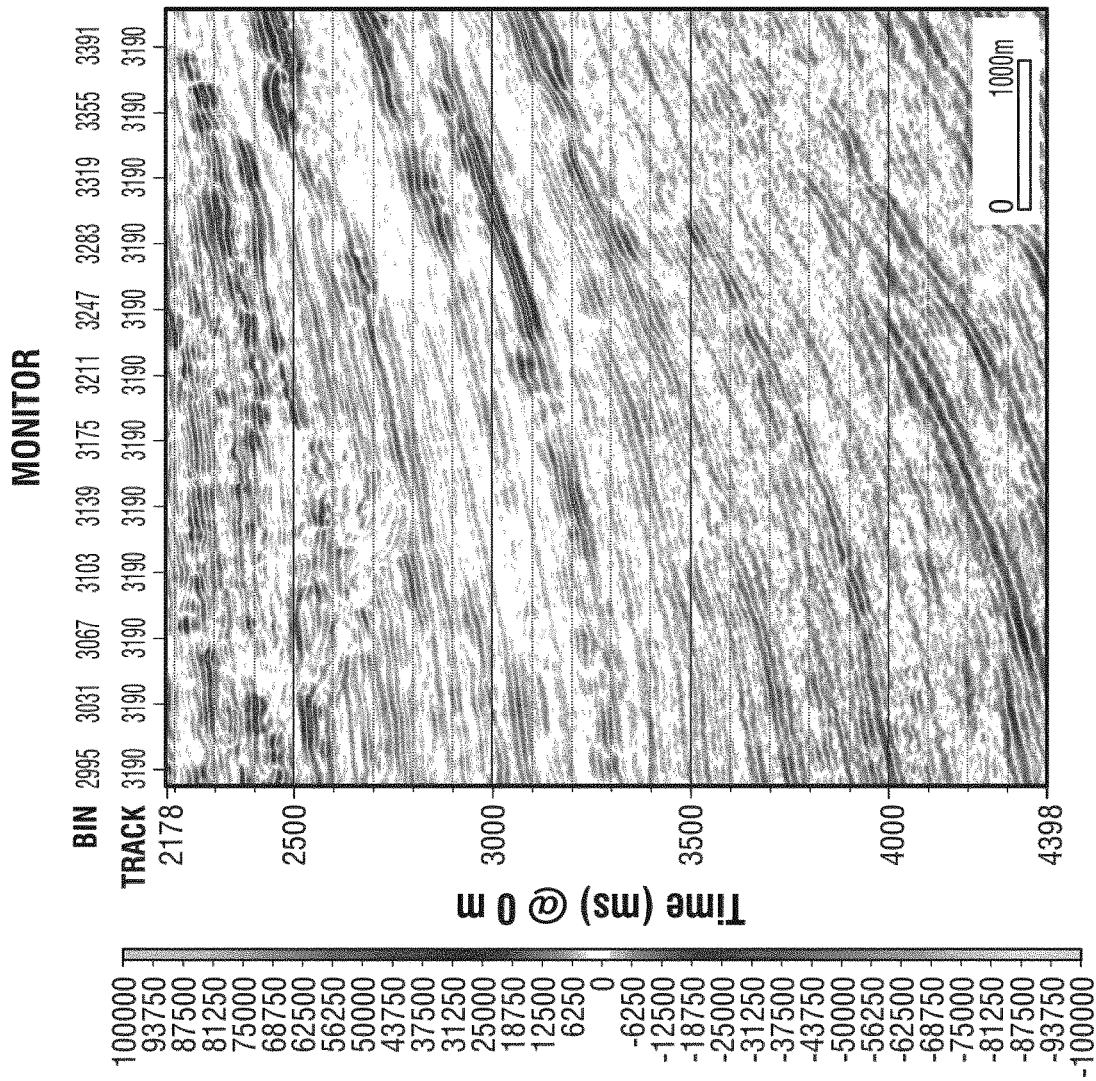
FIG. 2B shows an image of monitor seismic data from the Bonga field after a time lapse.

A baseline 3D seismic streamer survey was acquired in 2000 and the first monitor streamer seismic survey in this field we acquired in 2008. The quality of the 4D seismic data was excellent, with around 12% NRMS. FIG. 2A shows the baseline and FIG. 2B the monitor co-processed seismic data along a region where large time-lapse amplitude changes are taking place at two different reservoir levels. Particularly changes in fluid saturations are thought to create large time-lapse amplitude differences.

The data were first analyzed using cross-correlation to time-align the monitor to the baseline data using two cross-correlation gates of +/−120 ms and +/−240 ms both using triangular weighting to reduce cross-correlation edge effects. FIGS. 3A to 3F compare cross-correlation time shifts, time strains (time derivative of the time shift in %), and aligned difference seismic for the two cross correlation gates tested. Looking at the time-shift results, a lot of anomalous time shifts are observed in the vicinity of the reservoir event with large positive and negative values that do not persist deep below the reservoirs. The anomalous time shifts depend on the cross-correlation gate used, and these tend to bracket the reservoir with a width equal to the cross-correlation gate.

Figure 3A:
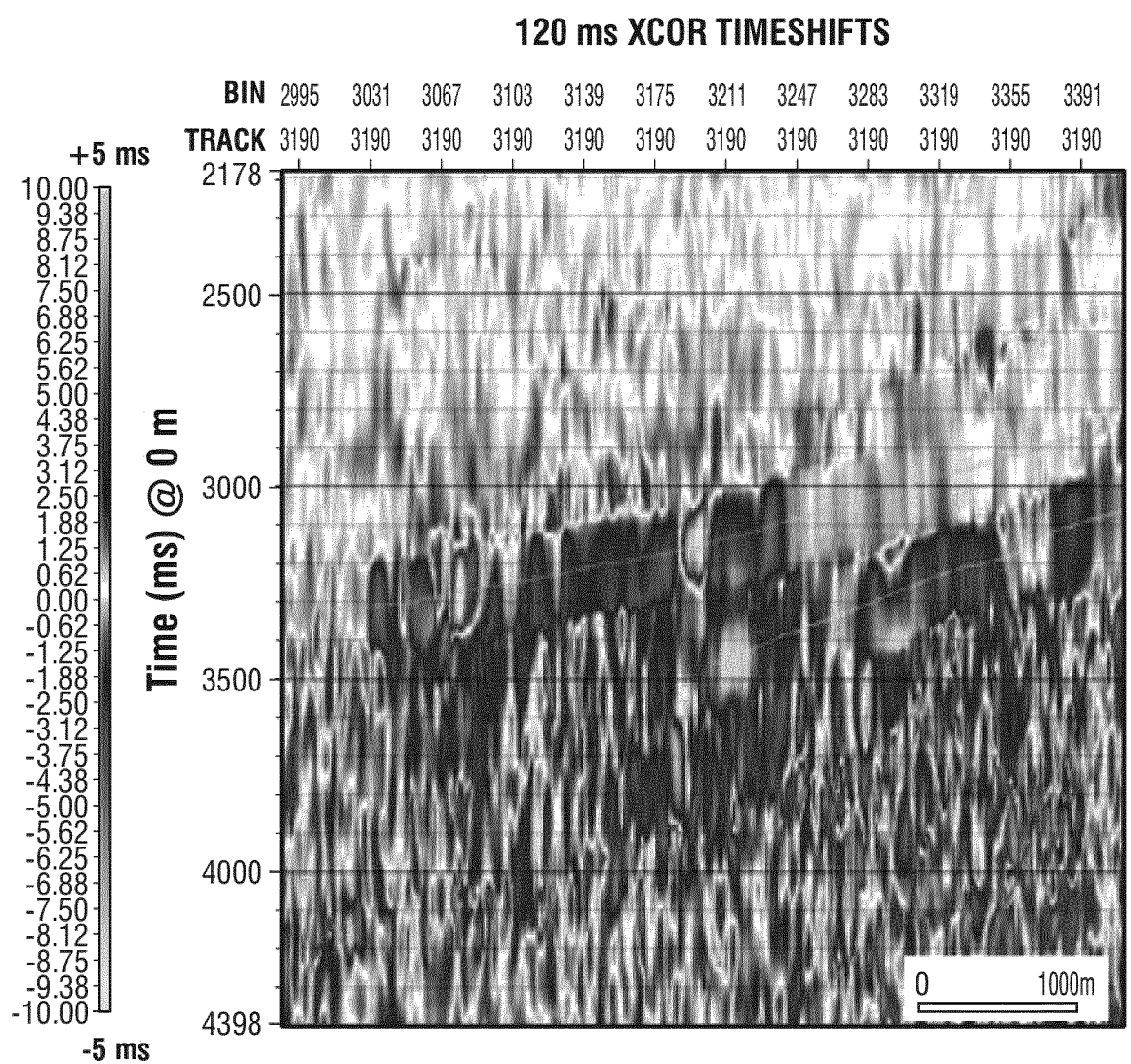
FIG. 3A shows an image of time shifts using cross-correlation method with a +/−120 ms gate derived from the data of the Bonga field as comparison to FIG. 4A.
Figure 3B:
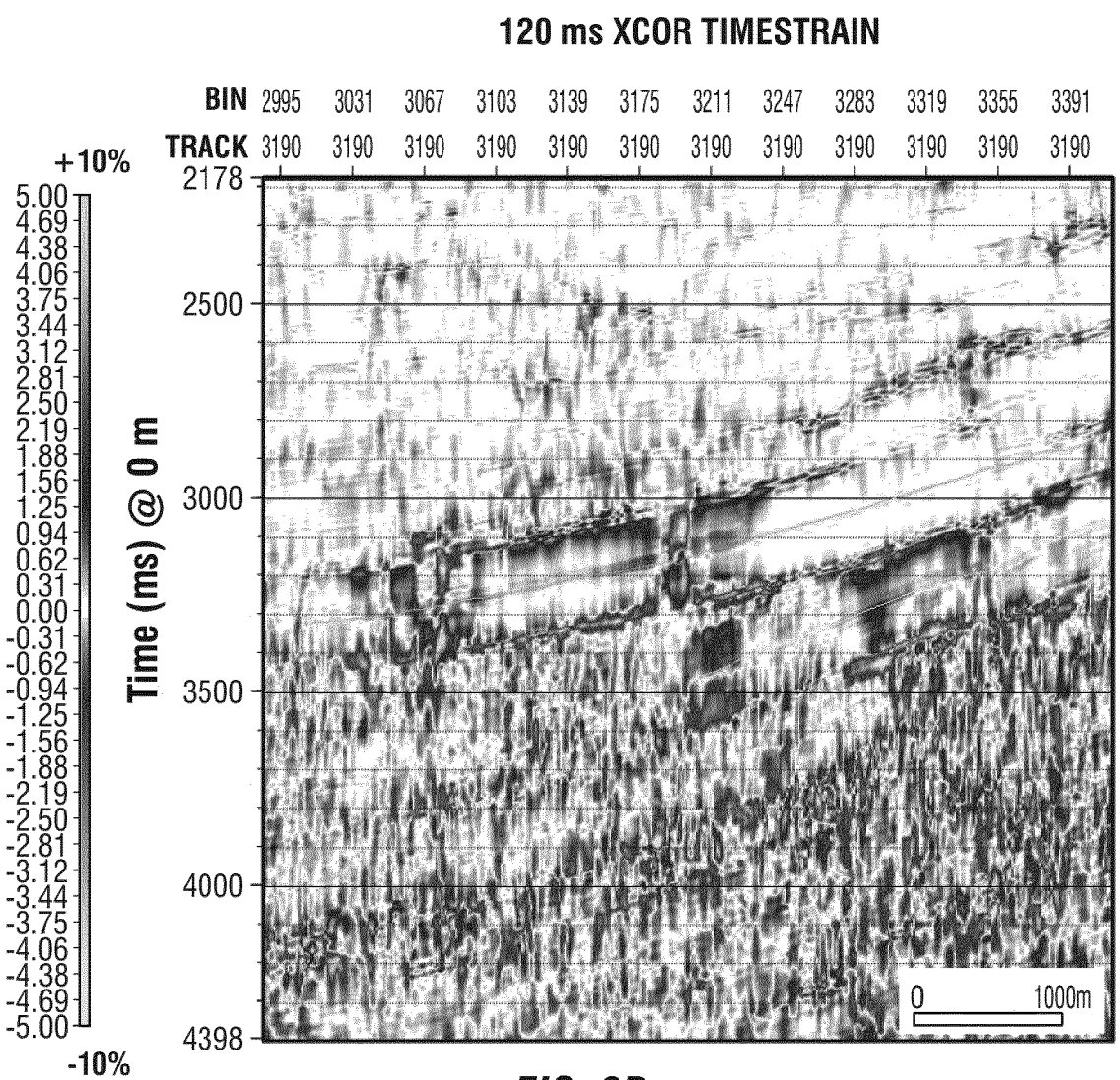
FIG. 3B shows an image of time strains with the cross-correlation method with the +/−120 ms gate derived from the data of the Bonga field as comparison to FIG. 4B.
Figure 3C:
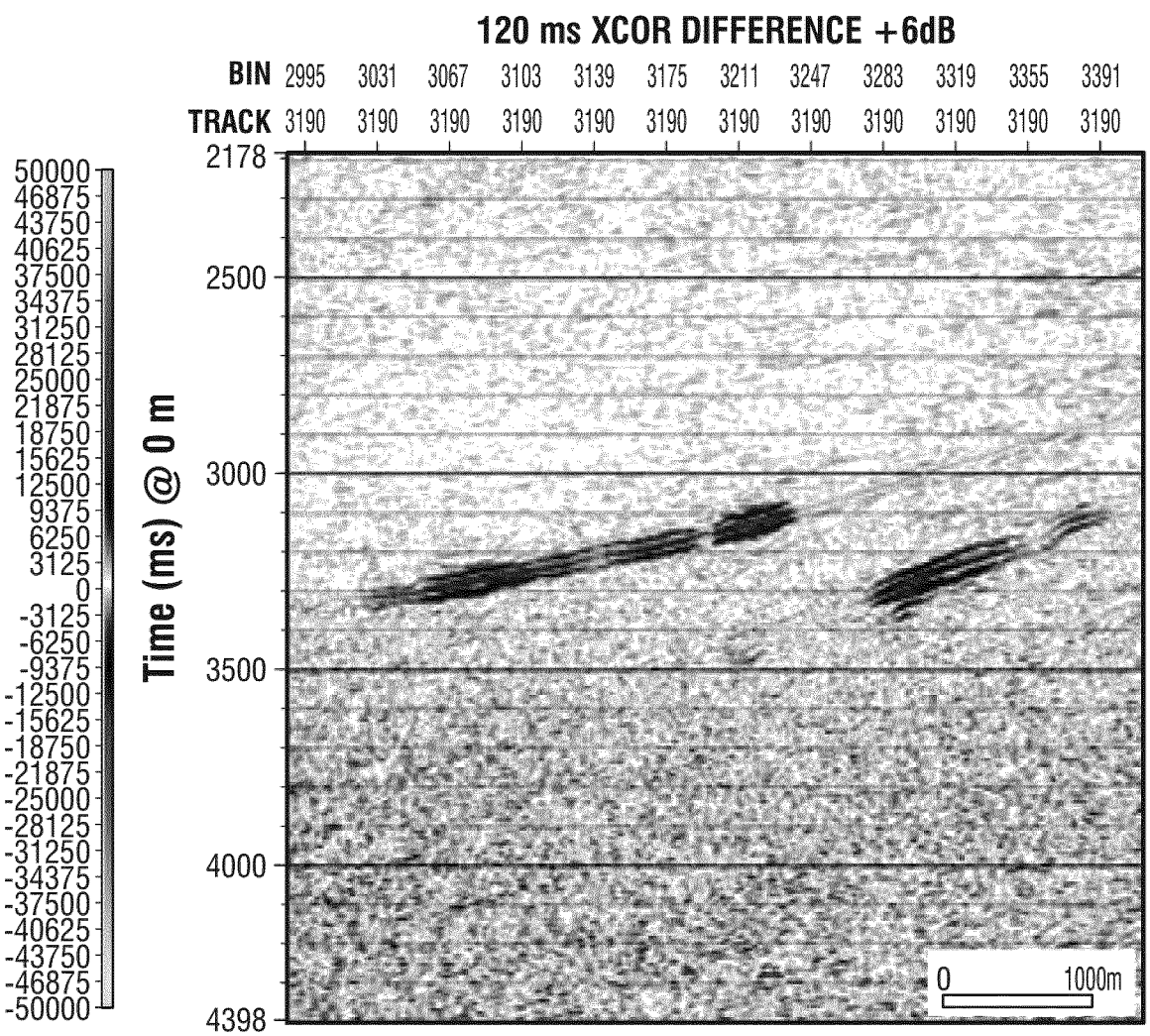
FIG. 3C shows an image of difference seismic signal using the cross-correlation method with the +/−120 ms gate derived from the data of the Bonga field as comparison to FIG. 4C.
Figure 3D:
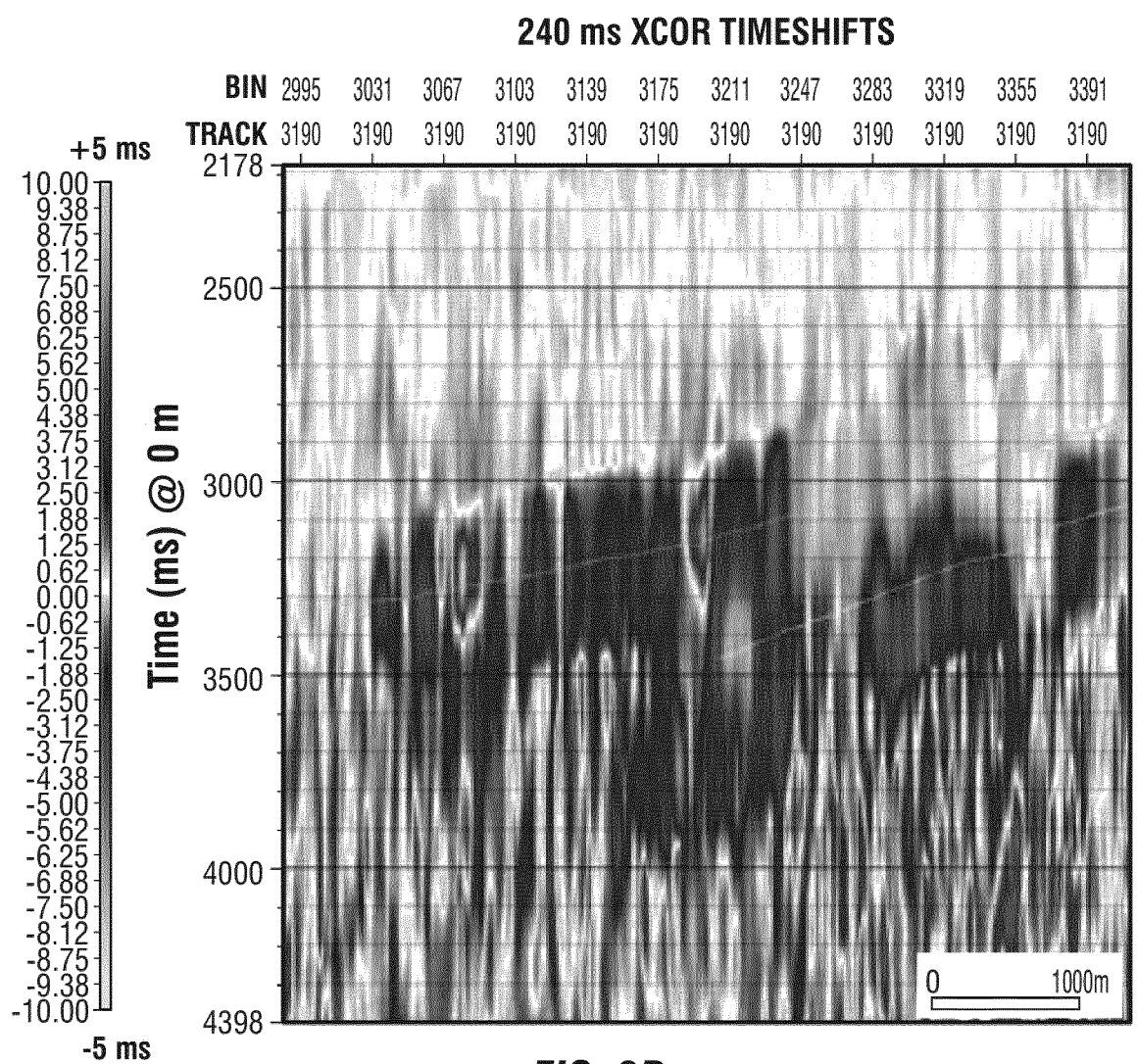
FIG. 3D shows an image of time shifts using cross-correlation method with a +/−240 ms gate derived from the data of the Bonga field as comparison to FIG. 4A.
Figure 3E:
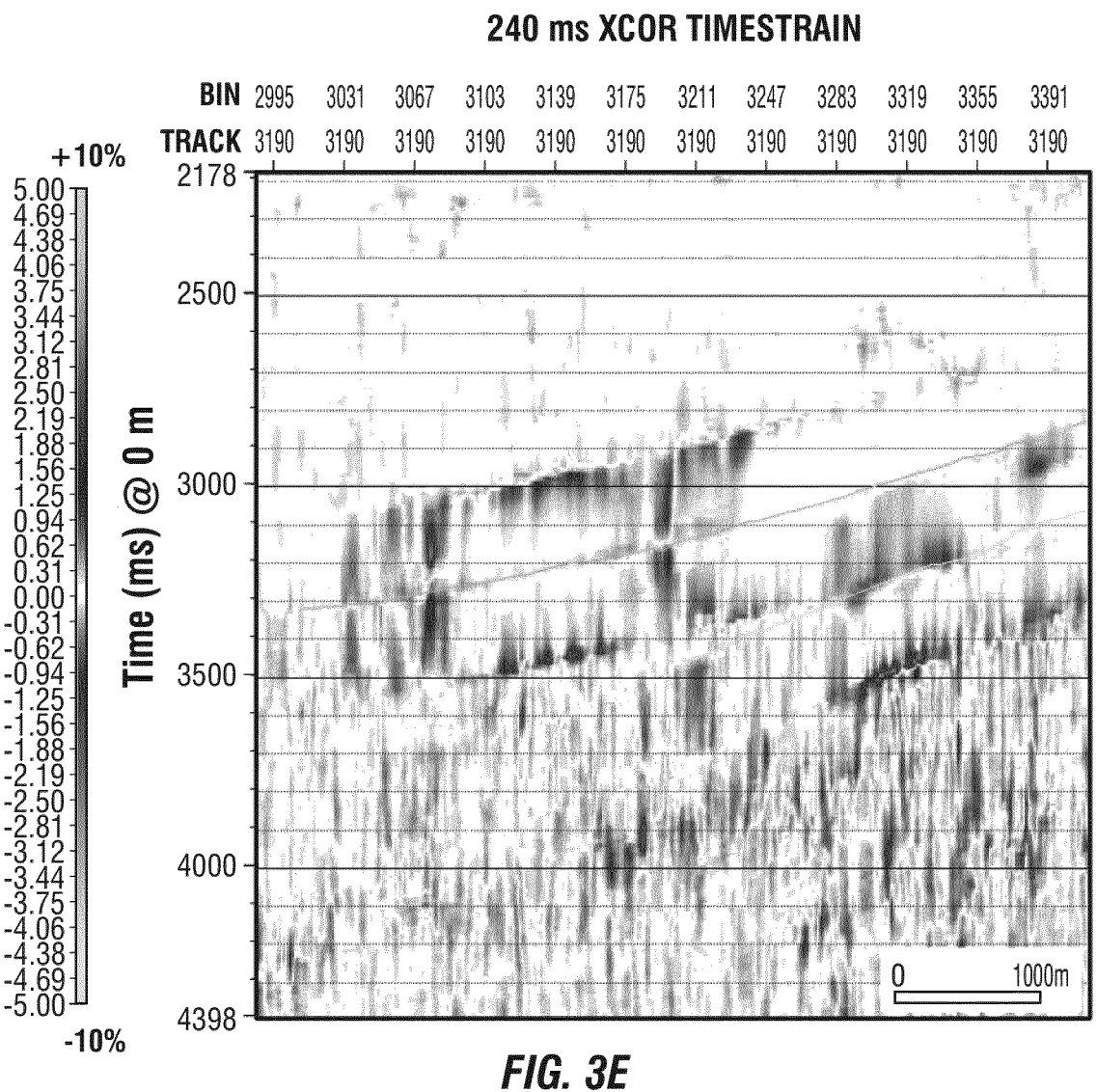
FIG. 3E shows an image of time strains with the cross-correlation method with the +/−240 ms gate derived from the data of the Bonga field as comparison to FIG. 4B.
Figure 3F:
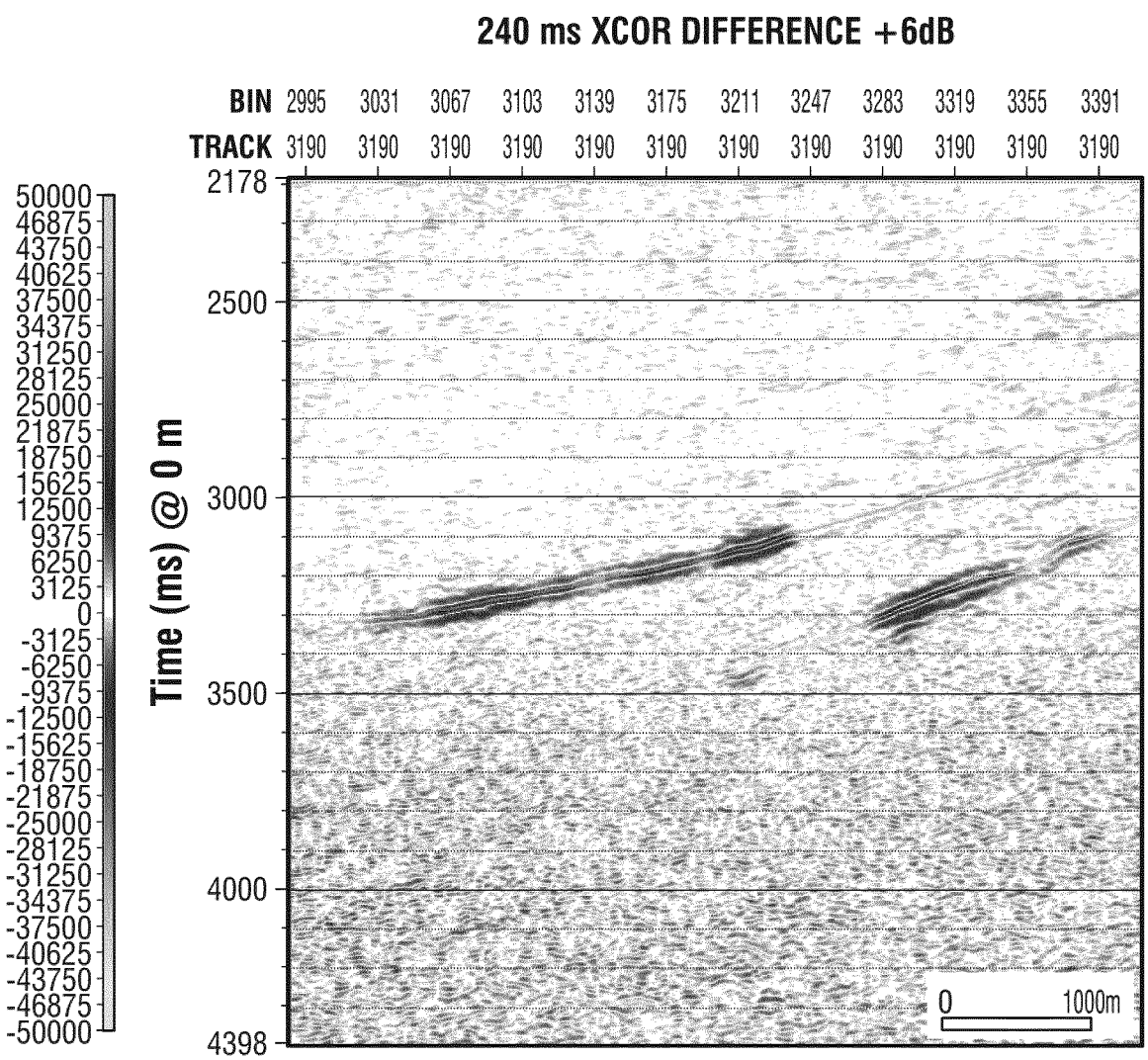
FIG. 3F shows an image of difference seismic signal using the cross-correlation method with the +/−240 ms gate derived from the data of the Bonga field as comparison to FIG. 4C.

This is not surprising, since the reservoir responses are large energy events compared to the overburden and underburden and once they enter cross-correlation gate they dominate the result. The time shifts near the reservoir are anomalous because if they were true time shifts they would persist at similar levels beneath the reservoir. Instead we see much larger (and different polarity) time shifts near the reservoir horizon than in the deep section. Time strains shown in FIGS. 3B and 3E, respectively extracted from the cross-correlation time shifts shown in FIGS. 3A and 3D, show strong side lobes away from the reservoir level which are artifacts of the cross-correlation gate. The difference seismic signal (respectively shown in FIGS. 3C and 3F) is largely unaffected by these anomalous time shifts, as the time shifts are small compared to the wavelengths in the data.

Figure 4A:
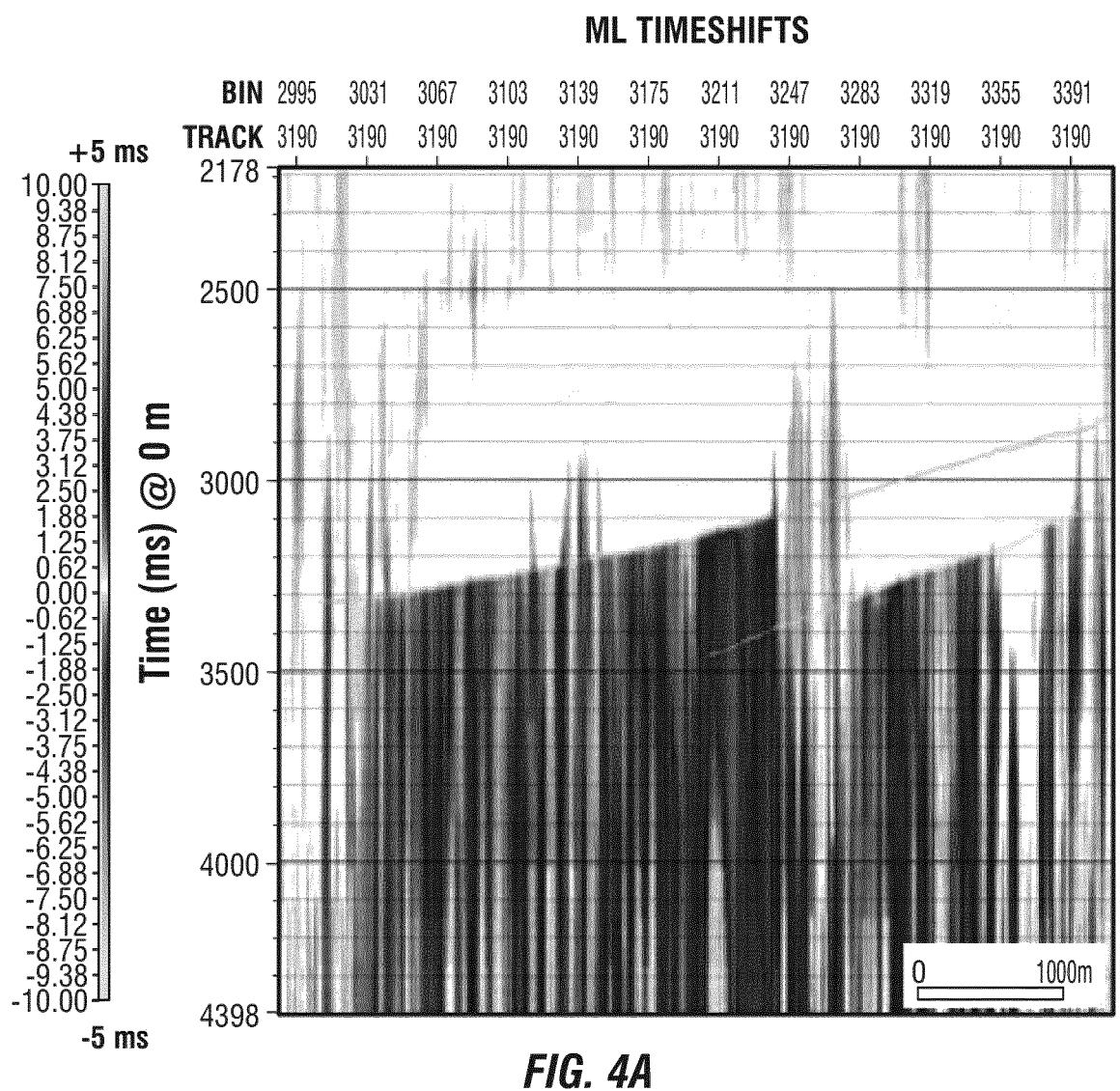
FIG. 4A shows an image of the time shifts obtained from the same data as used for FIGS. 3A and 3D but using the currently proposed method.
Figure 4B:
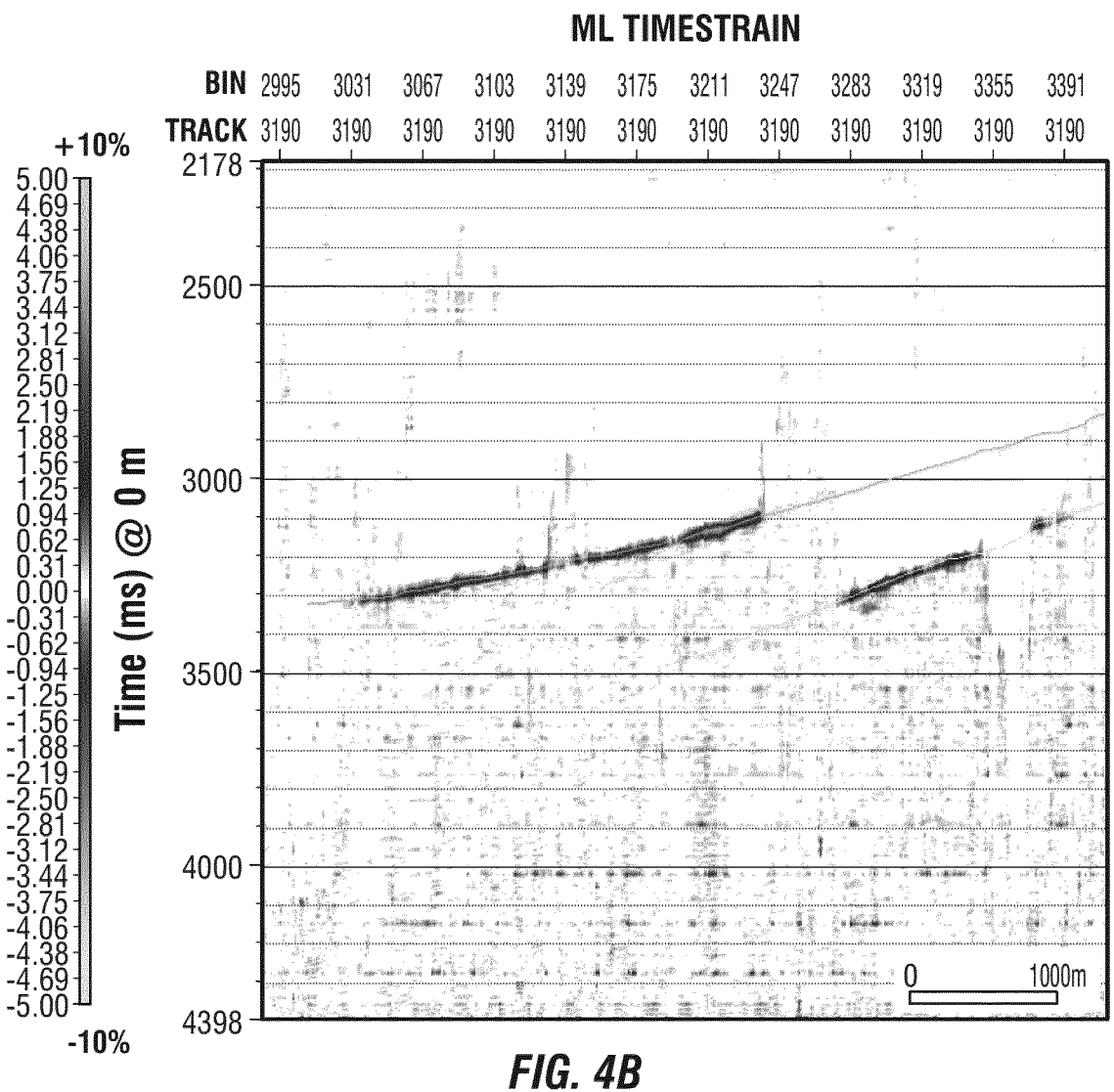
FIG. 4B shows an image of the time strains obtained from the same data as used for FIGS. 3B and 3E but using the currently proposed method.
Figure 4C:
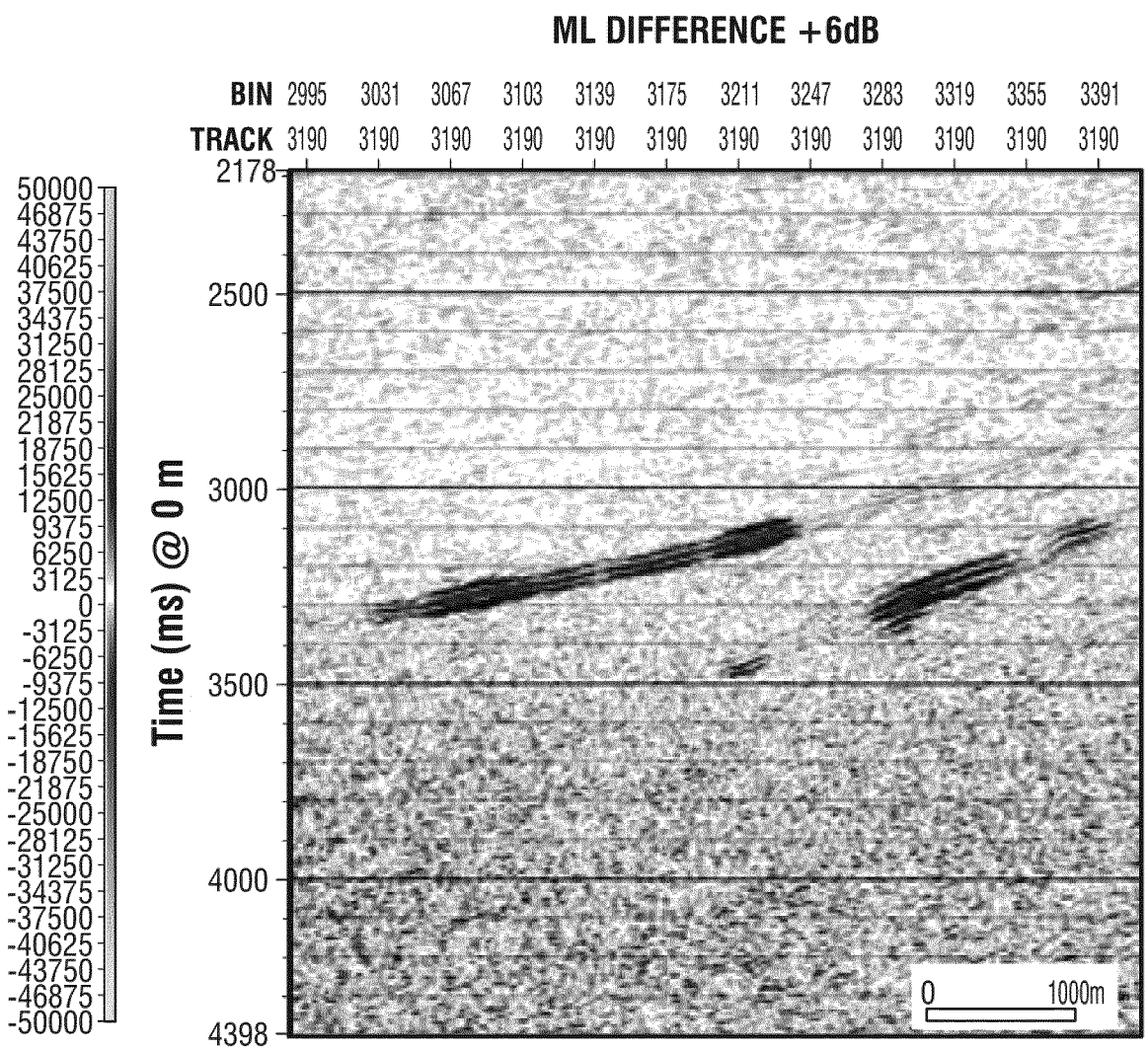
FIG. 4C shows an image of the difference seismic signals obtained from the same data as used for FIGS. 3C and 3F but using the currently proposed method.

FIGS. 4A to 4C shows the calculation of the time shifts, time strains and difference seismic using the machine learning algorithm trained by model synthetics base on Bonga rock properties. There are several significant improvements with the ML learning approach as compared to cross-correlation. One is that the time shifts have high resolution and their onset occurs directly at the reservoir horizon (note: the horizons were not provided to the ML learning algorithm) and the corresponding time-strains are localized to the reservoir layer and resemble the difference seismic. The polarity of the time strain (positive) is also consistent with what we expect from the rock physics model.

Figure 5A:
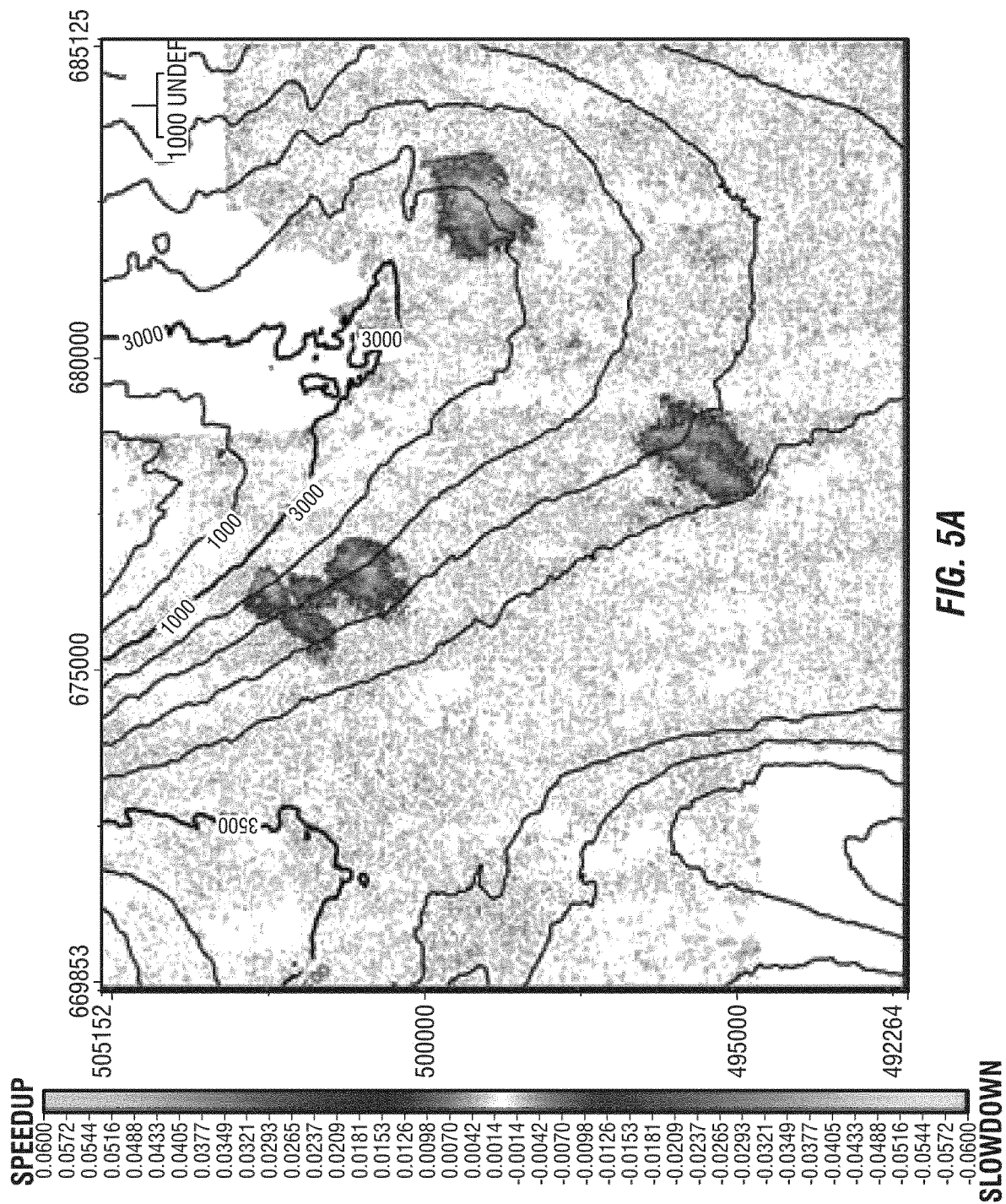
FIG. 5A shows a map of time strains extracted at the upper reservoir level view of the Bonga field data using the currently proposed method.
Figure 5B:
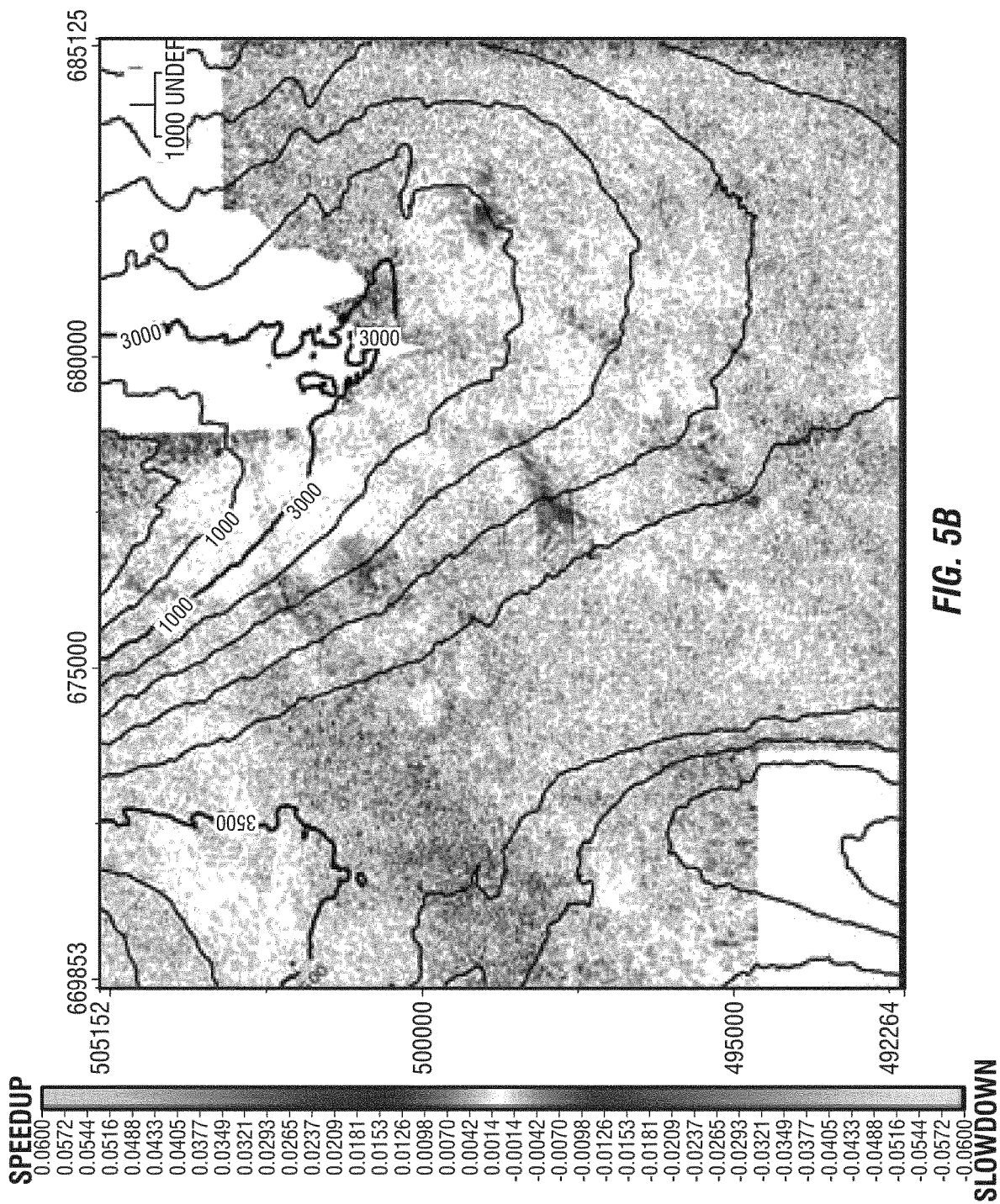
FIG. 5B shows a comparative map of time strains extracted at the upper reservoir level view of the Bonga field data using cross-correlation.
Figure 5C:
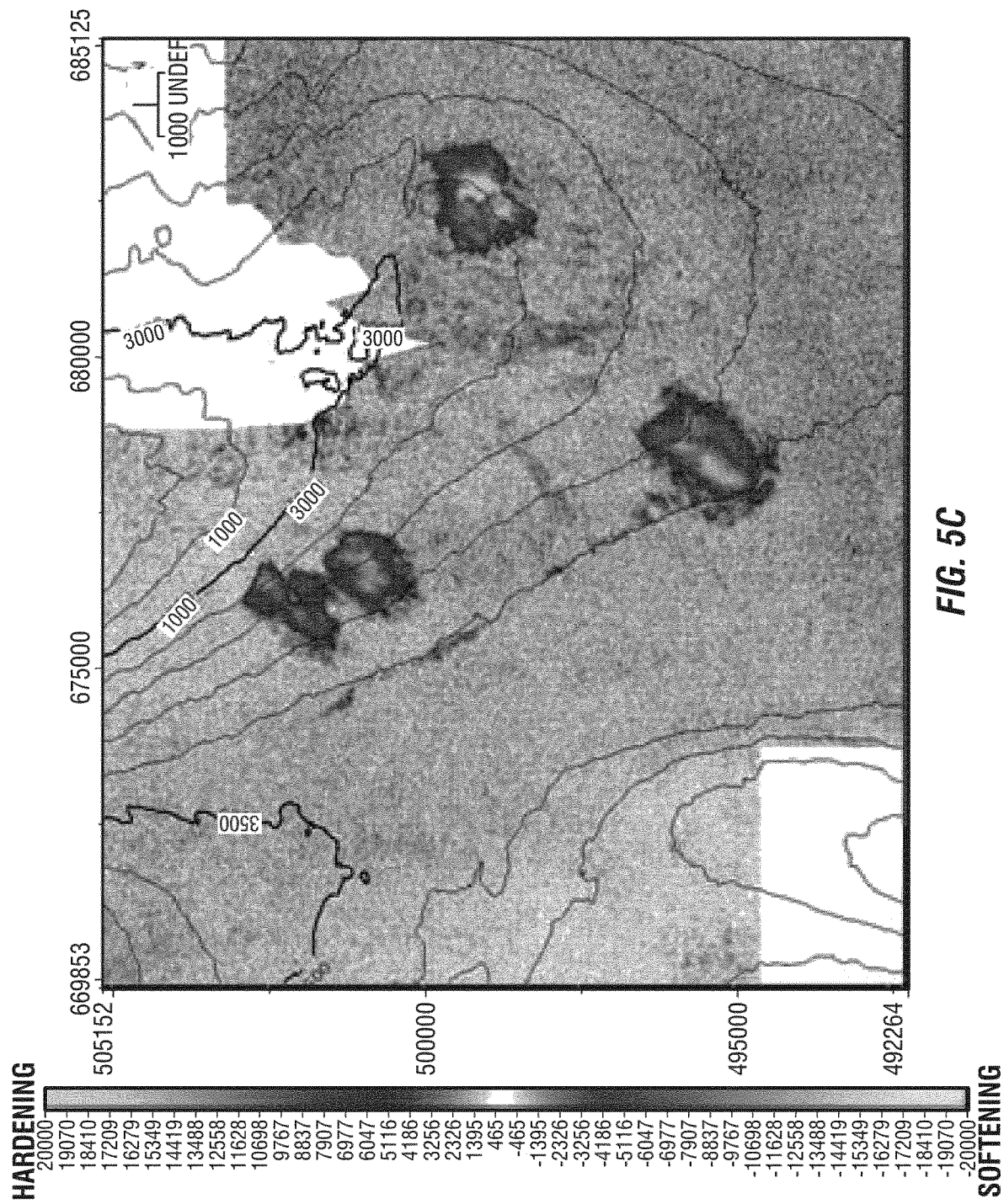
FIG. 5C show a dRMS map illustrating a comparison time strains of FIGS. 5A and 5B.

As illustrated in FIGS. 5A to 5C, the sharpness of the ML time-strain result allows us to generate maps of this attribute that can be meaningfully compared to other 4D attributes such as dRMS. FIG. 5C shows a comparison between ML and cross-correlation time-strains with the dRMS (rms(baseline)−rms(monitor)) attribute from the amplitudes. The time-strain map from the ML analysis has comparable resolution to maps obtained from amplitudes and is far superior to what is achieved with cross-correlation. The hardening signal in the dRMS map tends to match the speed-up signal in Xcor time strain map.

The deepwater Mars Field is in the central Gulf of Mexico, about 100 miles south of New Orleans. The stacked reservoirs in general are unconsolidated with high permeability and some aquifer support. Compaction due to production takes place as the pressure is reduced. Following primary production through depletion, injection projects have been conducted to support the pressure in some reservoirs but the overall production volumes exceed the injection volumes and many of the reservoirs continue to compact. The field has been frequently monitored with OBN surveys since the baseline in 2007 (Stopin et al., 2011). An OBN monitor survey of 2015 was used to test the currently proposed method.

Figure 6A:
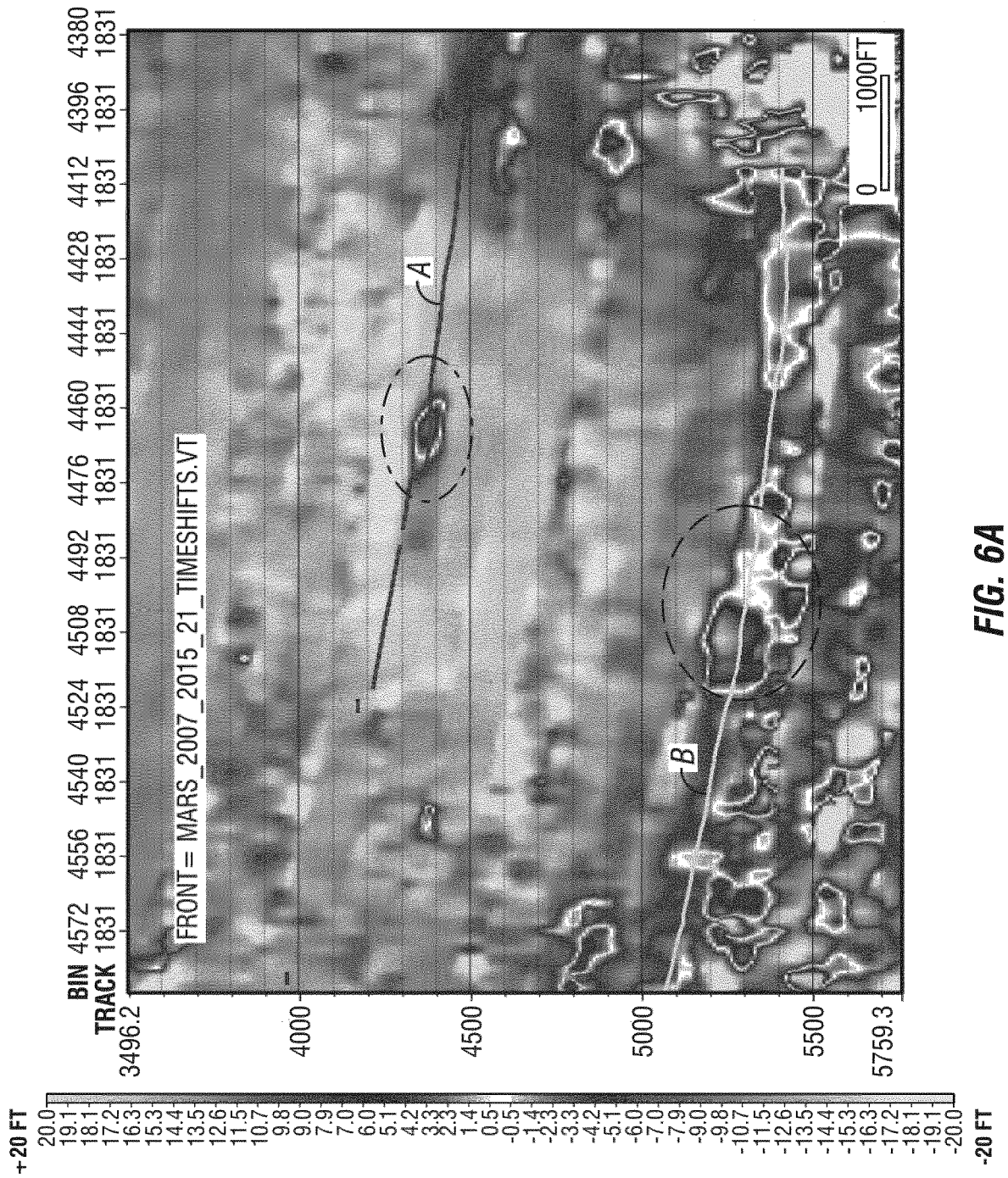
FIG. 6A shows a cross section image of depth shifts using cross correlation on results from Mars field as comparison for FIG. 6B.

FIG. 6A shows a cross-section of Xcor depth-shifts computed with a cross-correlation gate of +/−200 ft. The dominant negative depth-shifts indicate a slowdown due mainly to overburden stretching as a result of reservoir compaction. Along the two highlighted reservoirs, indicated by reference signs A and B, anomalous depth-shifts may be observed along the reservoir as speed-up signal only at the reservoir depths. Dot-dashed and dashed ovals highlight anomalous depth-shifts from Xcor.

Figure 6B:
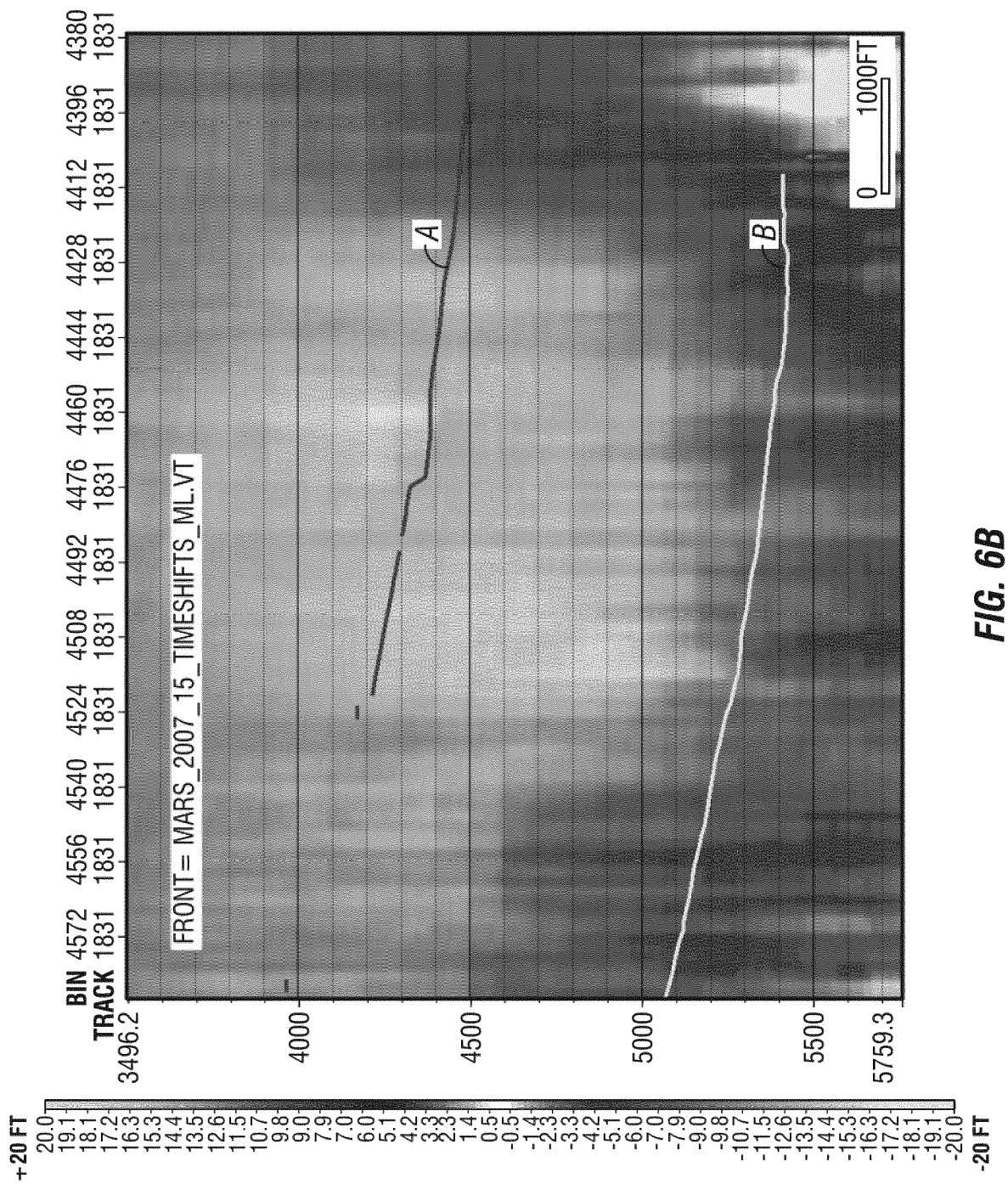
FIG. 6B shows a cross section image of depth shifts using the currently proposed method on the results from Mars field.
Figure 6C:
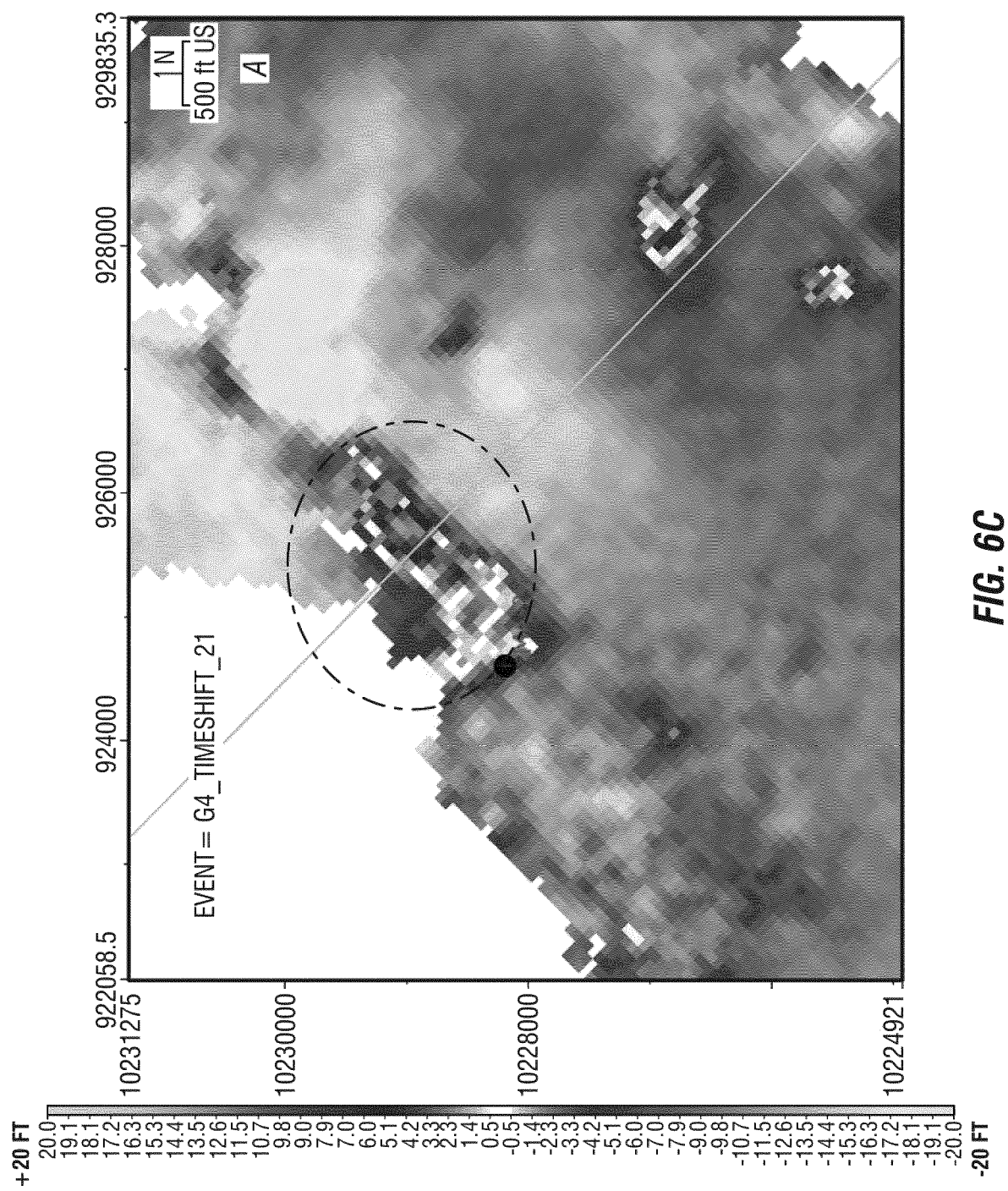
FIG. 6C shows a map of depth shifts at Reservoir A in the Mars field obtained using cross correlation as comparison to FIG. 6D.
Figure 6D:
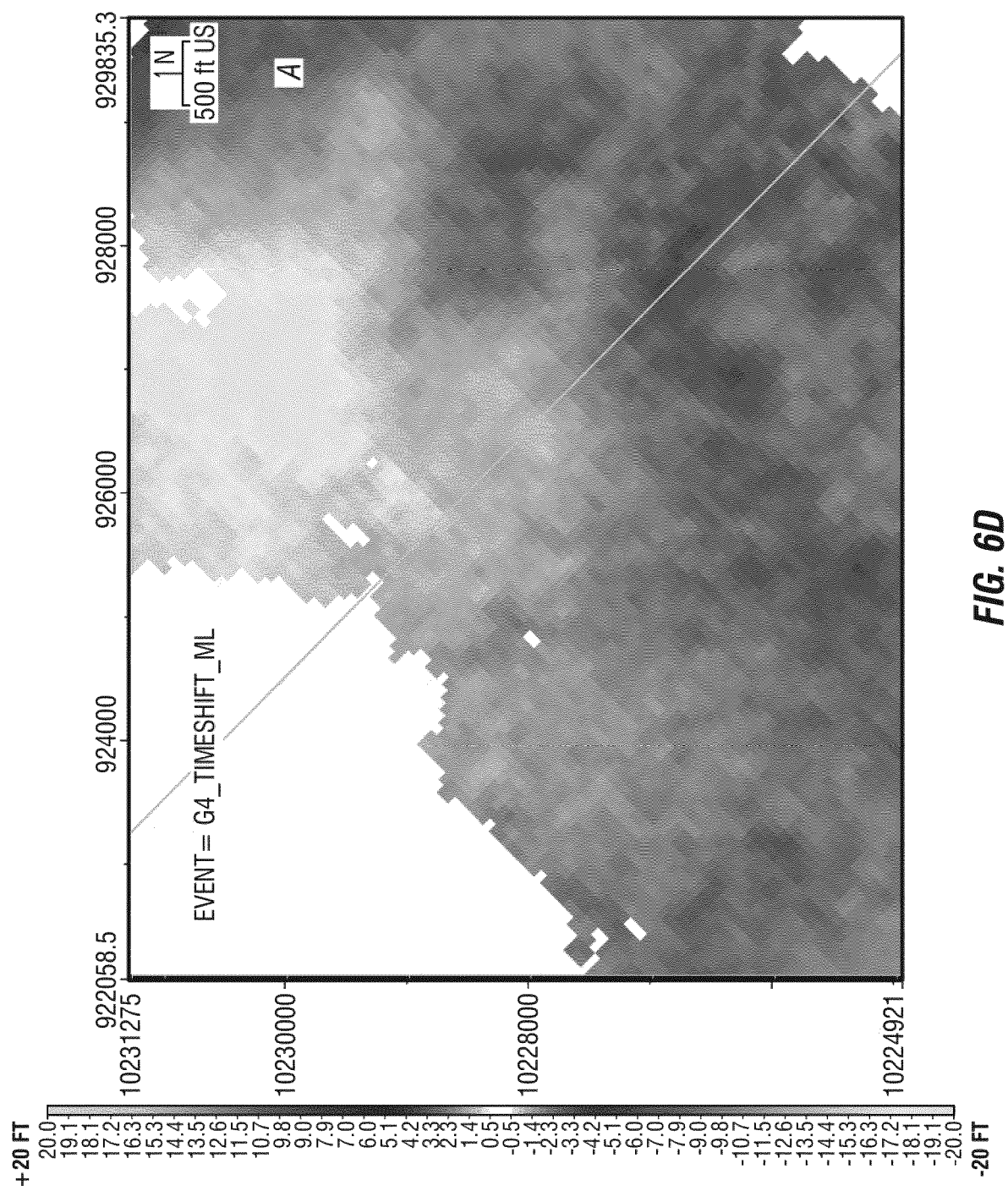
FIG. 6D shows a map of the depth shifts at Reservoir A in the Mars Field obtained using the currently proposed method.
Figure 6E:
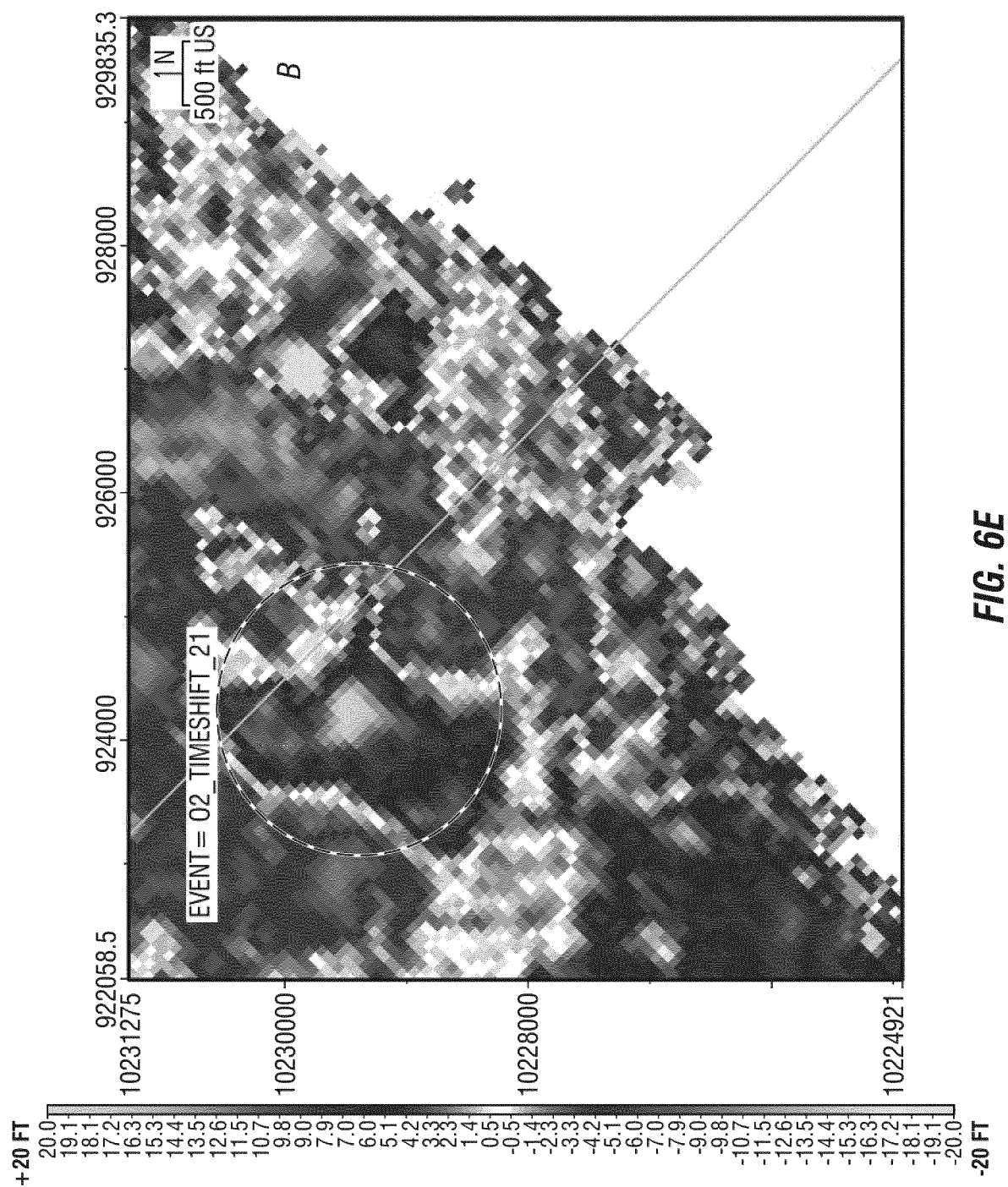
FIG. 6E shows a map depth shifts at Reservoir B in the Mars field obtained using cross correlation as comparison to FIG. 6F.

FIGS. 6C and 6E are maps of Xcor depth-shifts extracted at reservoir layers A and B, respectively. The production from reservoir A is from two layers: an upper compaction-driven layer without aquifer support and a lower layer with strong aquifer encroachment. Therefore, with production from both layers, the relative amplitudes corresponding the two layers change between the two seismic survey, thus causing the anomalous timeshifts at the marked oval in FIG. 6C. At reservoir B, the production is driven by compaction, fluid expansion, aquifer drive, and waterflood. By comparing baseline and monitor seismic data, it may be observed that this anomalous speed-up signal is due to a phase change of seismic at sand layer B in the dashed oval in FIG. 6E. In the amplitude maps (e.g., dRMS), hardening is seen at this location due to water movement updip. The anomalous speedup likely indicates an asymmetric pattern of saturation change in the reservoir.

Figure 6F:
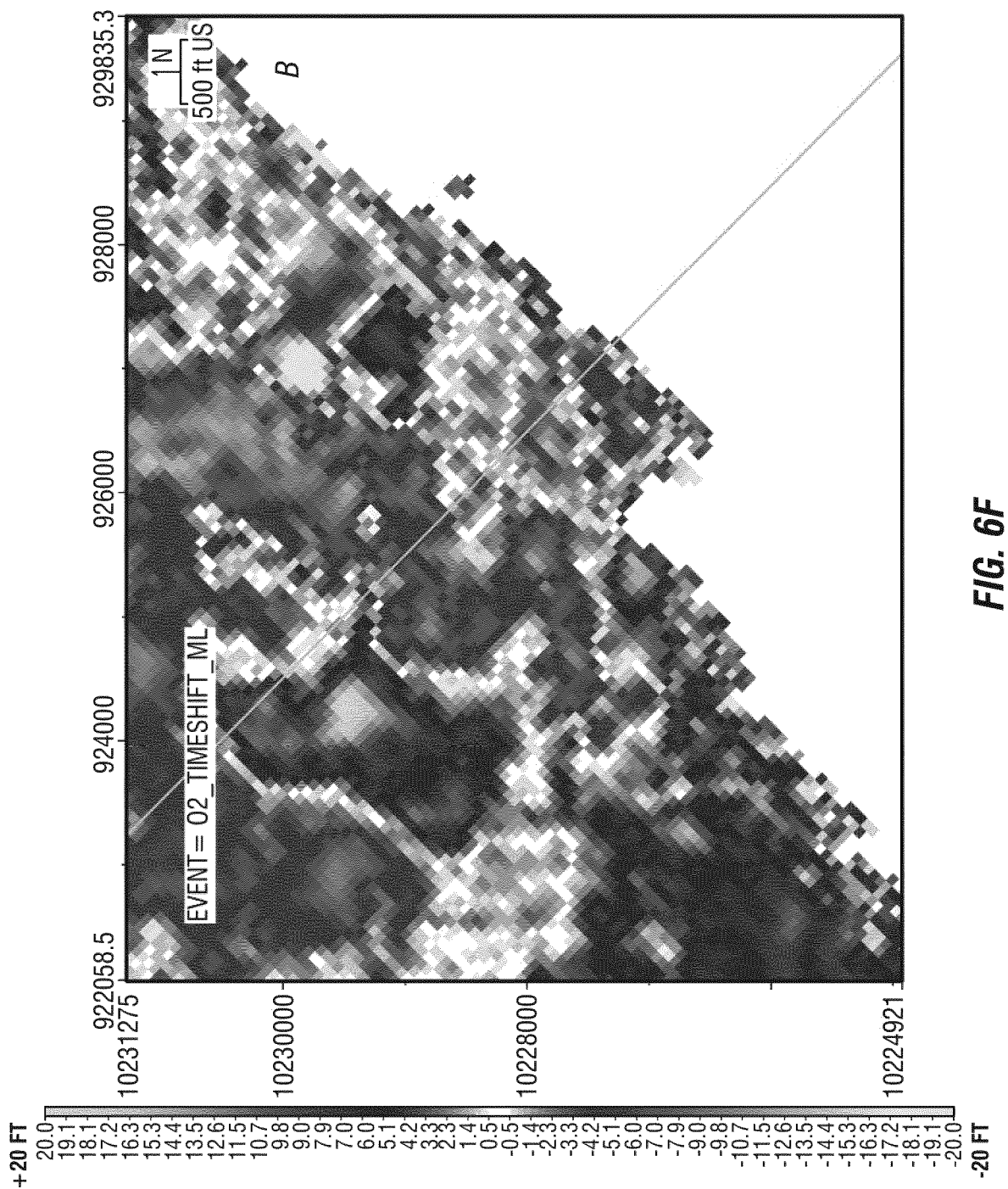
FIG. 6F shows a map of the depth shifts at Reservoir B in the Mars Field obtained using the currently proposed method ML.

To generate synthetic training data for ML model, we have randomized reservoir depth, wavelet frequency, and overburden/under-burden compaction R-factor. FIG. 6B shows a cross-section of ML depth-shifts. Away from the anomalous timeshift regions where only compaction is dominant, ML and Xcor methods generate similar depth-shifts. Compared to Xcor, ML generates more consistent depth-shifts across the reservoirs. FIGS. 6D and 6F are ML depth-shifts extracted at reservoir A and B, respectively.

As, for this example, zero saturation change were considered in in synthetic data generation, the ML model in this particular case does not recognize depth-shifts in the OBN seismic data due to saturation change. The person skilled in the art will understand that this can be readily included in the MLmodel as needed for the Mars OBN data. For example, scenarios of saturation change and stacked reservoirs may be included in synthetic training data simulations. It will be understood that for other fields and other situtations, the ML model may be trained with other synthetic data wherein certain other types of reservoir property changes are included as needed.

Furthermore, the ML model may be trained by labeling the data with other 4D attributes. The examples above used time shifts, and time strains were derived from the time shifts. However, we have also been able to train the back-propagation enabled model by feeding the baseline-monitor pairs of synthetic seismic traces and the corresponding ground truth time strains, in a similar way as described above for time shifts. We thereby obtained a trained back-propagation enabled model which provides time strains as direct output. It will be apparent to the person skilled in the art that the method may be further extended to other useful 4D attributes, including rock-property related attributes such as for example: oil/gas/water saturation changes, reservoir compaction, overburden/underburden strain, velocity change, and impedance change.

Throughout the above specification, the reference has been made to the following literature:

Adejonwo, A., I. Al-Mandhary, R. Detomo Jr., O. Effiom, W. Gouveia, N. Kremers, E. Legius, A. MacLellan, R. Mcclenaghan, A. Onuwaje, E. Quadt and S. Weaver, 2009, The Bonga 4D—Shell Nigeria's first Deepwater time lapse monitor: $71^{st}$ Conference and Exhibition, EAGE, Extended Abstracts, Y003.

Detomo, R. Jr., E. Quadt, C. Pirmez, R. Mbah and S. Olutu, 2012, Ocean bottom node seismic: learnings from Bonga, Deepwater offshore Nigeria: $82^{nd}$ Annual International Meeting, SEG, Expanded Abstracts, 1-5.

Hatchell, P. J., and S. J. Bourne, 2005, Measuring reservoir compaction using time-lapse timeshifts: 75th Annual International Meeting, SEG, Expanded Abstracts, 2500-2503.

Ronneberger, Olaf, Philipp Fischer, and Thomas Brox. "U-net: Convolutional networks for biomedical image segmentation." International Conference on Medical image computing and computer-assisted intervention. Springer, Cham, 2015.

Stopin, A., P. J. Hatchell, E. Beal, E., C. Gutierrez, G. Soto, and C. Corcoran, 2011, First OBS to OBS result in the Mars basin: 73rd Conference & Exhibition, EAGE, Extended Abstracts, G033.

MacBeth, Colin, Maria-Daphne Mangriotis, and Paul Hatchell. "Evaluation of the spurious time-shift problem." SEG Technical Program Expanded Abstracts 2016. Society of Exploration Geophysicists, 2016. 5457-5462.

The person skilled in the art will understand that the present invention can be carried out in many various ways without departing from the scope of the appended claims.

We claim:

1. A computer-implemented method of estimating time-lapse property changes of a subsurface volume, comprising:
providing actual baseline-monitor pairs of baseline seismic traces of a physical subsurface Earth volume and monitor seismic traces of the physical subsurface Earth volume as obtained from physical seismic measurements in the physical subsurface Earth volume acquired at respectively a first time and second time which is later than the first time by a time lapse;
feeding the actual baseline-monitor pairs of seismic traces to a trained backpropagation enabled model, and obtaining as output estimates of the time-lapse property changes of the actual subsurface Earth volume,
wherein the trained backpropagation enabled model has been obtained by:
generating synthetic models of the subsurface volume with pre-determined property changes before and after a time lapse, said synthetic models comprising seismic velocities;
computing baseline-monitor pairs of synthetic seismic traces using the models generated before and after the time lapse wherein the baseline synthetic traces are computed from the synthetic model before the time lapse and the monitor synthetic traces are computed from the synthetic model after the time lapse;
deriving a ground truth 4D attribute characterizing the time-lapse property changes in the synthetic models;
training a backpropagation enabled model by feeding the baseline-monitor pairs of synthetic seismic traces and the corresponding ground truth 4D attribute, whereby obtaining the trained backpropagation enabled model.

2. The computer-implemented method of claim 1, wherein random noise has been added to the synthetic seismic traces.

3. The computer-implemented method of claim 1, wherein the backpropagation enabled model comprises a deep neural network.

4. The computer-implemented method of claim 1, wherein the backpropagation enabled model comprises a U-Net structure.

5. The computer-implemented method of claim 1, wherein employing a backpropagation enabled process for training the backpropagation enabled model, wherein the baseline-monitor pairs of synthetic seismic traces are provided in two distinguished input channels in said backpropagation enabled process.

6. The computer-implemented method of claim 1, wherein said estimates of the time-lapse property changes comprises at least one selected from the group consisting of time shifts and time strains.

7. The computer-implemented method of claim 1, wherein said estimates of the time-lapse property changes comprises rock property changes.

8. The computer-implemented method of claim 7, wherein said rock property changes comprise at least one of the group consisting of: oil/gas/water saturation changes, reservoir compaction, overburden/underburden strain, velocity change, and impedance change.

9. A computer-implemented method of training a backpropagation enabled model for estimating time-lapse property changes of a subsurface volume, comprising:
generating synthetic models of the subsurface volume with pre-determined property changes before and after a time lapse, said synthetic models comprising seismic velocities;
computing baseline-monitor pairs of synthetic seismic traces using the models generated before and after the time lapse wherein the baseline synthetic traces are computed from the synthetic model before the time lapse and the monitor synthetic traces are computed from the synthetic model after the time lapse;
deriving a ground truth 4D attribute characterizing the time-lapse property changes in the synthetic models;
training a backpropagation enabled model by feeding the baseline-monitor pairs of synthetic seismic traces and the corresponding ground truth 4D attribute, whereby obtaining the trained backpropagation enabled model.

* * * * *